US011272522B2

(12) United States Patent
Agiwal et al.

(10) Patent No.: US 11,272,522 B2
(45) Date of Patent: Mar. 8, 2022

(54) METHOD AND APPARATUS FOR PERFORMING SCHEDULING REQUEST TO SUPPORT PLURALITY OF SERVICES EFFICIENTLY

(71) Applicant: Samsung Electronics Co., Ltd., Suwon-si (KR)

(72) Inventors: Anil Agiwal, Suwon-si (KR); Jungmin Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/009,681

(22) Filed: Jun. 15, 2018

(65) Prior Publication Data
US 2018/0368156 A1  Dec. 20, 2018

(30) Foreign Application Priority Data

Jun. 15, 2017 (KR) .................. 10-2017-0076050
Sep. 27, 2017 (KR) .................. 10-2017-0125577

(51) Int. Cl.
*H04W 72/12* (2009.01)
*H04W 72/04* (2009.01)

(52) U.S. Cl.
CPC .......... *H04W 72/1242* (2013.01); *H04W 72/0446* (2013.01); *H04W 72/1278* (2013.01); *H04W 72/1284* (2013.01)

(58) Field of Classification Search
CPC ......... H04W 72/0446; H04W 72/1278; H04W 72/1242; H04W 72/1284
See application file for complete search history.

(56) References Cited

U.S. PATENT DOCUMENTS

| 2012/0039263 | A1 | 2/2012 | Moberg et al. | |
| 2012/0195281 | A1 | 8/2012 | Kim | |
| 2014/0086159 | A1* | 3/2014 | Sajadieh | H04W 72/12 370/329 |
| 2017/0290028 | A1* | 10/2017 | Lee | H04W 72/14 |

(Continued)

FOREIGN PATENT DOCUMENTS

| KR | 10-2017-0015935 A | 2/2017 |
| WO | 2017/074437 A1 | 5/2017 |

OTHER PUBLICATIONS

Ericsson, 'Uplink Dynamic Scheduling in NR', R2-1700430, 3GPP TSG-RAN WG2 NR Ad Hoc, Spokane, USA Jan. 6, 2017.

(Continued)

*Primary Examiner* — Syed Ali
(74) *Attorney, Agent, or Firm* — Jefferson IP Law, LLP

(57) ABSTRACT

The present disclosure relates to a communication scheme for the convergence of a 5G communication system for supporting a higher data transfer rate after the 4G system and the IoT technology and a system thereof. A method for performing a scheduling request (SR) is provided. The method performed by a user equipment (UE) comprises receiving, from a base station, first information on a mapping relation between an SR configuration and a logical channel (LCH), receiving, from the base station, second information on a condition for initiating a regular buffer status report (BSR) transmission procedure regardless of priority, and transmitting, to the base station, the SR based on the first information and the second information.

16 Claims, 15 Drawing Sheets

(56) References Cited

U.S. PATENT DOCUMENTS

| | | | |
|---|---|---|---|
| 2018/0077719 A1* | 3/2018 | Nory | H04L 5/0042 |
| 2018/0077749 A1* | 3/2018 | Yamada | H04L 5/0053 |
| 2018/0124802 A1* | 5/2018 | Yi | H04W 72/14 |
| 2018/0227938 A1 | 8/2018 | Lee et al. | |
| 2018/0324867 A1* | 11/2018 | Basu Mallick | H04W 72/1242 |
| 2018/0352567 A1* | 12/2018 | Ye | H04W 72/1284 |
| 2018/0359766 A1* | 12/2018 | Shih | H04W 72/12 |
| 2019/0313379 A1* | 10/2019 | Lee | H04W 72/0413 |
| 2020/0163109 A1* | 5/2020 | Zhang | H04W 72/14 |
| 2020/0214029 A1* | 7/2020 | Li | H04W 74/0833 |
| 2020/0267753 A1* | 8/2020 | Adjakple | H04W 72/1226 |
| 2020/0329484 A1* | 10/2020 | Lee | H04W 4/44 |

OTHER PUBLICATIONS

Intel Corporation, 'Enhancement of SR/BSR', R2-1704784, 3GPP TSG RAN WG2 Meeting #98, Hangzhou, China, May 7, 2017.
Huawei et al., 'SR enhancements with multiple numerologies', R2-1705625, 3GPP TSG RAN WG2, Meeting #98, Hangzhou, China, May 6, 2017.
Ericsson, 'SR and BSR signalling content in NR', R2-1702745, 3GPP TSG-RAN WG2 #97bis, Spokane, USA, Mar. 25, 2017.
Ericsson, 'SR signalling content in NR', R2-1704375, 3GPP TSG RAN WG2 Meeting #98, Hangzhou, China, May 6, 2017.
International Search Report dated Sep. 20, 2018, issued in International Patent Application No. PCT/KR2018/006764.
Korean Office Action dated May 25, 2021, issued in a counterpart Korean Application No. 10-2017-0125577.
Extended European Search Report dated Apr. 1, 2020, issued in a counterpart European Application No. 18816831.4-1215/3622768.
Huawei et al: "SR triggering and cancellation", 3GPP Draft; R2-1705198 SR Triggering and Cancellation, 3rd Generation Partnership Project (3GPP), vol. RAN WG2, No. XP051275674; May 14, 2017 Hangzhou, China.
Ericsson: "SR and BSR triggering aspects", 3GPP Draft; R2-1702746—SR and BSR Triggering Aspects, 3rd Generation Partnership Project (3GPP), vol. RAN WG2, No. XP051244734; Apr. 3, 2017, Spokane, USA.

* cited by examiner

METHOD AND APPARATUS FOR PERFORMING SCHEDULING REQUEST TO SUPPORT PLURALITY OF SERVICES EFFICIENTLY

CROSS-REFERENCE TO RELATED APPLICATION(S)

This application is based on and claims priority under 35 U.S.C. § 119(a) of a Korean patent application number 10-2017-0076050, filed on Jun. 15, 2017, in the Korean Intellectual Property Office, and under 35 U.S.C. § 119(a) of a Korean patent application number 10-2017-0125577, filed on Sep. 27, 2017, in the Korean Intellectual Property Office, the disclosure of each of which is incorporated by reference herein in its entirety.

BACKGROUND

1. Field

The disclosure relates to an operation for a user equipment (UE) to request resource allocation from a base station in order to perform uplink transmission in a mobile communication system. More particularly, the disclosure relates to an operation regarding when a UE will start a scheduling request transmission procedure by initiating a regular buffer status report (BSR).

2. Description of the Related Art

In order to meet the needs for radio data traffic tending to increase after the commercialization of the 4th generation (4G) communication system, efforts to develop an improved 5th generation (5G) communication system or pre-5G communication system are made. For this reason, the 5G communication system or pre-5G communication system is called a Beyond 4G Network communication system or a Post long term evolution (LTE) system.

In order to achieve a high data transfer rate, an implementation of the 5G communication system in an ultra-high frequency (mmWave) band (e.g., a 60 GHz band) is taken into consideration. In order to reduce the path loss of radio waves in the ultra-high frequency band and increase the transfer distance of radio waves, beamforming, massive multiple input multiple output (MIMO), full dimensional MIMO (FD-MIMO), an array antenna, analog beamforming, and large scale antenna technologies are discussed in the 5G communication system.

Furthermore, for the network improvement of a system, in the 5G communication system, technologies, such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation, are developed.

In addition, in the 5G system, hybrid frequency shift keying (FSK) and quadrature amplitude modulation (QAM) modulation (FQAM) and sliding window superposition coding (SWSC), that is, an advanced coding modulation (ACM) scheme, and a filter bank multi-carrier (FBMC), non-orthogonal multiple access (NOMA), and sparse code multiple access (SCMA), that is, advanced access technologies, are developed.

With the recent development of the communication system, active research of a method of performing a scheduling request in a next-generation communication system is in progress. Accordingly, there is an increasing need for the improvement of a method for a UE to perform a scheduling request in the state in which the UE uses a plurality of services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an operation regarding how a scheduling request (SR) procedure of a user equipment (UE) will be initiated when the UE uses a plurality of services and an SR configuration is applied for each service.

Another aspect of the disclosure is to provide a new radio (NR) system being discussed in the 5th generation (5G) mobile communication system or $3^{rd}$ generation partnership project (3GPP) provides various services, such as enhanced mobile broadband (eMBB), ultra-reliable low latency communications (URLLC) and enhanced machine type communications (eMTC), through a plurality of numerologies or transmission time interval (TTI) lengths. In this system, when a UE requests uplink (UL) resources from a base station because data regarding a given service occurs in the UE, an SR configuration including a different SR for each service may be applied.

Additional aspects will be set forth in part in the description which follows and, in part, will be apparent from the description, or may be learned by practice of the presented embodiments.

In accordance with as aspect of the disclosure, a method for performing SR by a UE in a wireless communication system is provided. The method includes receiving, from a base station, first information on mapping relation between SR configuration and logical channel (LCH), receiving, from the base station, second information on condition for initiating a regular buffer status report (BSR) transmission procedure regardless of priority, and transmitting, to the base station, SR based on the first information and the second information.

The method further comprises identifying LCH in which data has occurred identifying SR configuration mapped to the LCH in which the data has occurred based on the first information, and comparing a priority of the LCH in which the data has occurred with a priority of another LCH in which data is already present, the SR configuration being mapped to the another LCH.

The method further comprises when the priority of the LCH in which the data has occurred is higher according to the comparing, transmitting, to the base station, the SR for the LCH in which the data has occurred based on the SR configuration mapped to the LCH, and when the LCH in which the data has occurred satisfies the condition according to the second information, transmitting, to the base station, the SR for the LCH in which the data has occurred based on the SR configuration mapped to the LCH.

Wherein the condition for initiating the BSR transmission procedure includes at least one of LCH for initiating the BSR transmission procedure regardless of priority, SR configuration for initiating the BSR transmission procedure regardless of priority, numerology for initiating the BSR transmission procedure, TTI for initiating the BSR transmission procedure, and resource index for initiating the BSR transmission procedure.

Wherein a first timer prohibiting SR transmission for a first LCH and a second timer prohibiting SR transmission for a second LCH are configured to the UE, and wherein the first LCH is mapped to a first SR configuration and the second LCH is mapped to a second SR configuration.

Wherein the SR transmission for the first LCH is determined based on the first timer and the second timer, and the SR transmission for the second LCH is determined based on the second timer.

Wherein a first counter for SR transmission for a first LCH and a second counter for SR transmission for a second LCH are configured to the UE, and wherein the first LCH is mapped to a first SR configuration and the second LCH is mapped to a second SR configuration.

In accordance with as aspect of the disclosure, a method for receiving an SR by a base station in a wireless communication system is provided. The method includes transmitting, to a UE, first information on mapping relation between SR configuration and LCH, transmitting, to the UE, second information on condition for initiating a regular BSR transmission procedure regardless of priority, and receiving, from the UE, SR based on the first information and the second information.

In accordance with as aspect of the disclosure, a UE for performing an SR in a wireless communication system is provided. The UE includes a transceiver, and a controller coupled with the transceiver and configured to control to receive, from a base station, first information on mapping relation between SR configuration and LCH, receive, from the base station, second information on condition for initiating a regular BSR transmission procedure regardless of priority, and transmit, to the base station, SR based on the first information and the second information.

In accordance with as aspect of the disclosure, a base station for receiving an SR in a wireless communication system is provided. The base station includes a transceiver and a controller coupled with the transceiver and configured to control to transmit, to a UE, first information on mapping relation between SR configuration and LCH, transmit, to the UE, second information on condition for initiating a regular BSR transmission procedure regardless of priority, and receive, from the UE, SR based on the first information and the second information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
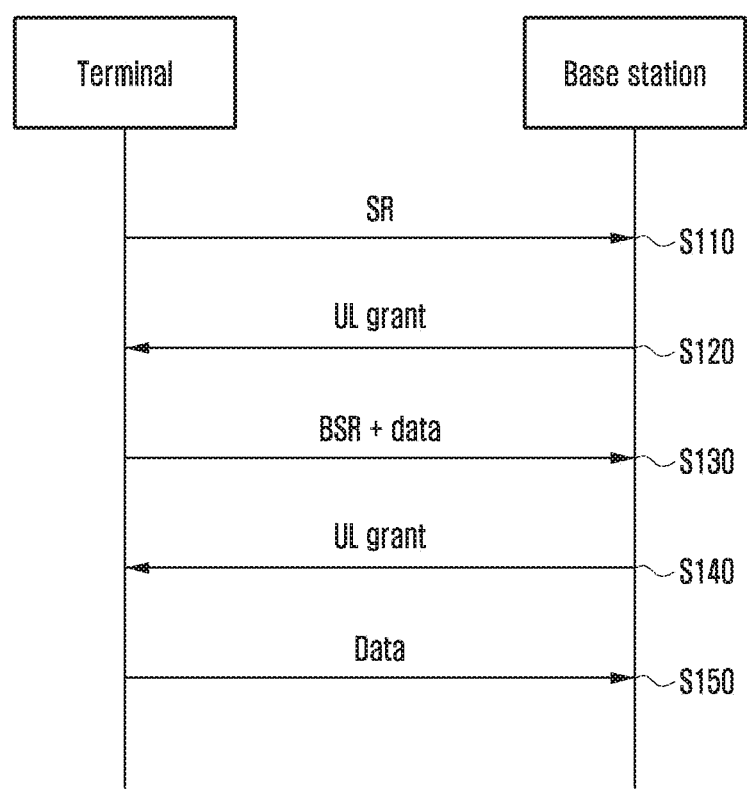
FIG. 1 shows a scheduling request procedure in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this specification, in describing the embodiments, a description of contents that are well known in the art to which the disclosure pertains and are not directly related to the disclosure is omitted in order to transfer the gist of the disclosure more clearly without making the gist of the disclosure obscure by omitting an unnecessary description.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided only to complete the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit" in the embodiment means software or a hardware component, such as a field programmable gate array (FPGA) or an application-specific integrated circuit (ASIC), and the "unit" performs given tasks. However, the meaning of the "unit" is not limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate one or more central processing units (CPUs) within a device or a security multimedia card.

In a next-generation mobile communication system, the $5^{th}$ generation (5G) mobile communication system or a new radio (NR) system being discussed in the $3^{rd}$ generation partnership project (3GPP), unlike the $4^{th}$ generation (4G) mobile communication system or long term evolution (LTE) system, communication between a user equipment (UE) and a base station is performed using a plurality of numerologies, a plurality of transmission time intervals (TTIs) or a plurality of radio resources having different physical attributes. In this case, the radio resources having different physical attributes may be divided into identifiers having names, such as a numerology index, physical (PHY) profile or transmission profile. In the disclosure, when communication is performed using a plurality of numerologies, a plurality of TTIs or a plurality of radio resources having different physical attributes, detailed operations of a scheduling request (SR) procedure for uplink (UL) transmission/reception are described.

FIG. 1 shows an SR procedure of a UE and a base station in an LTE system according to an embodiment of the disclosure.

Referring to FIG. 1, an SR procedure of FIG. 1 is described specifically. In operation S110, the UE having data to be transmitted to the base station transmits an SR signal to the base station in an SR resource allocated thereto. In this case, the SR resource is commonly configured in a physical uplink control channel (PUCCH). In operation S120, the base station that has received the SR signal from the UE allocates an UL resource for UL transmission to the UE. In this case, information about the UL resource is commonly transmitted through a physical downlink control channel (PDCCH). In operation S130, the UE transmits a buffer status report (BSR) and data using the UL resource allocated by the base station. In operation S140, the base station that has received the BSR from the UE allocates an additional UL resource, if necessary, based on the amount of data included in the buffer of the UE. In operation S150, the UE transmits data included in its buffer using the UL resource allocated by the base station.

The operation S110 that corresponds to the first operation of the UE is performed when a regular BSR is internally initiated in the UE. In the LTE system, such an operation is defined as follows.

If the Buffer Status reporting procedure determines that at least one BSR has been triggered and not cancelled:
    if the MAC entity has UL resources allocated for new transmission for this TTI:
        instruct the Multiplexing and Assembly procedure to generate the BSR MAC control element(s);

start or restart periodicBSR-Timer except when all the generated BSRs are Truncated BSRs;
start or restart rebBSR-Timer.
else if a Regular BSR has been triggered and logicalChannelSR-ProhibitTimer is not running:
if an uplink grant is not configured or the Regular BSR was not triggered due to data becoming available for transmission for a logical channel for which logical channel SR masking (logicalChannelSR-Mask) is setup by upper layers:
a Scheduling Request shall be triggered.

That is, the UE starts an SR procedure in the following two cases:
if a regular BSR has been initiated and logicalChannelSR-ProhibitTimer does not operate, and
if an UL resource has not been allocated or a regular BSR has not been initiated by the data of a logical channel (LCH) in which logicalChannelSR-Mask has been configured.

Furthermore, in the LTE system, a regular BSR start condition is defined as follows.
A Buffer Status Report (BSR) shall be triggered if any of the following events occur:
UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

That is, the UE initiates a regular BSR procedure in the following two cases:
If the data of an LCH having higher priority than an LCH to which data included in the buffer of the UE belongs occurs.
If data to be transmitted occurs when there is no data in the buffer of the UE.

In various parts, in the NR system based on operations defined in the LTE system, the regular BSR start condition of the NR system may be defined based on the aforementioned regular BSR start condition of the LTE system. Furthermore, the SR start condition of the NR system may be defined based on the aforementioned SR start condition of the LTE system. However, in the LTE system, communication between a UE and a base station is performed using one numerology or one TTI or radio resources having the same physical attributes. Accordingly, in the NR system, when communication is performed using a plurality of numerologies or a plurality of TTIs or a plurality of radio resources having different physical attributes, how the (SR) procedure will be performed needs to be newly defined.

Hereinafter, for convenience of document writing, a plurality of numerologies or a plurality of TTIs or a plurality of radio resources having different physical attributes is briefly indicated as a plurality of TTIs/numerologies/resource indices. From a viewpoint of a plurality of TTIs/numerologies/resource indices, the NR system has the following characteristics.
Data belonging to one LCH may be transmitted through a plurality of TTIs/numerologies/resource indices.
A base station may operate a plurality of SR configurations. Furthermore, each of the SR configurations may correspond to a given LCH or logical channel group (LCG) or TTI/numerology/resource index.

An example of such characteristics is as follows. First, an example regarding the relation between an LCH and TTIs/numerologies/resource indices may be defined as in Table 1.

TABLE 1

| LCH (1/2/3/4) | TTI type (A/B/C/D) | Corresponding relation (transmission possible/impossible) |
|---|---|---|
| LCH 1 | TTI A | O |
| | TTI B | O |
| | TTI C | O |
| | TTI D | O |
| LCH 2 | TTI A | O |
| | TTI B | O |
| | TTI C | X |
| | TTI D | X |
| LCH 3 | TTI A | X |
| | TTI B | X |
| | TTI C | O |
| | TTI D | O |
| LCH 4 | TTI A | X |
| | TTI B | X |
| | TTI C | X |
| | TTI D | O |

Another example regarding the relation between an LCH and TTIs/numerologies/resource indices may be defined as in Table 2.

TABLE 2

| LCH (1/2/3/4) | TTI type (A/B) | Numerology type (a/b) | Corresponding relation (transmission possible/impossible) |
|---|---|---|---|
| LCH 1 | TTI A | Numerology a | O |
| | | Numerology b | O |
| | TTI B | Numerology a | O |
| | | Numerology b | X |
| LCH 2 | TTI A | Numerology a | O |
| | | Numerology b | O |
| | TTI B | Numerology a | X |
| | | Numerology b | X |
| LCH 3 | TTI A | Numerology a | X |
| | | Numerology b | X |
| | TTI B | Numerology a | O |
| | | Numerology b | O |
| LCH 4 | TTI A | Numerology a | X |
| | | Numerology b | X |
| | TTI B | Numerology a | X |
| | | Numerology b | O |

Furthermore, an example regarding the relation between a plurality of SR configurations and an LCH may be defined as in Table 3.

TABLE 3

| SR configuration (X/Y/Z) | LCH (1/2/3/4/5/6/7/8) |
|---|---|
| SR configuration X | LCH 1, LCH 2 |
| SR configuration Y | LCH 3, LCH 4 |
| SR configuration Z | LCH 5, LCH 6, LCH 7, LCH 8 |

In Table 3 showing the relation between SR configurations and LCHs, one group may be generated by collecting a plurality of LCHs corresponding to a given SR configuration. In the disclosure, the group is called an SR LCH group. For example, an LCH 1 and an LCH 2 may become an SR LCH group X, and an LCH 3 and an LCH 4 may become an SR LCH group Y. Furthermore, an LCH 5, an LCH 6, an LCH 7, and an LCH 8 may become an SR LCH group Z.

Furthermore, an example regarding the relation between a plurality of SR configurations and an LCG may be defined as in Table 4.

TABLE 4

| SR configuration (X/Y/Z) | LCG (1/2/3/4/5/6/7/8) |
|---|---|
| SR configuration X | LCG 1 |
| SR configuration Y | LCG 2, LCG 3, LCG 4, LCG 5 |
| SR configuration Z | LCG 6, LCG 7, LCG 8 |

In Table 4 showing the relation between an SR configuration and LCGs, one group may be generated by collecting a plurality of LCGs corresponding to a given SR configuration. In the disclosure, the group is called an SR LCG group. For example, an LCG 1 may become an SR LCH group X, and an LCG 2, an LCG 3, an LCG 4, and an LCH 4 may become an SR LCH group Y. Furthermore, an LCH 6, an LCH 7, and an LCH 8 may become an SR LCH group Z.

Furthermore, an example regarding the relation between a plurality of SR configurations and a TTI/numerology/resource index may be defined as in Table 5.

TABLE 5

| SR configuration (X/Y/Z) | TTI type (A/B) | Numerology type (a/b) |
|---|---|---|
| SR configuration X | TTI A | Numerology a, numerology b |
| SR configuration Y | TTI B | Numerology a |
| SR configuration Z | TTI B | Numerology b |

In this case, the SR configuration includes a time/frequency resource and condition in which a UE transmits an SR signal. There is shown below an SR configuration-related information element (IE) in the LTE system.

SchedulingRequestConfig

The IE SchedulingRequestConfig is used to specify the Scheduling Request related parameters SchedulingRequestConfig information element
ASN1START
SchedulingRequestConfig::=CHOICE {
  release NULL,
  setup SEQUENCE {
    sr-PUCCH-ResourceIndex INTEGER (0 ... 2047),
    sr-ConfigIndex INTEGER (0 ... 157),
    dsr-TransMax ENUMERATED {
      n4, n8, n16, n32, n64, spare3, spare2, spare1}
  }
}

In the above SchedulingRequestConfig IE, sr-PUCCH-ResourceIndex and sr-ConfigIndex correspond to parameters indicative of time/frequency resources in which a UE transmits an SR signal.

Figure 2:
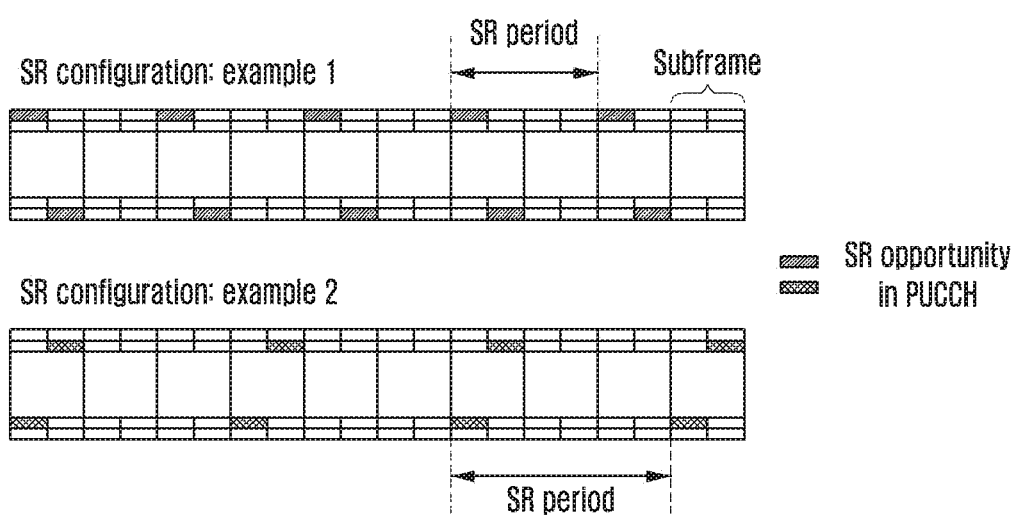
FIG. 2 shows an example of different scheduling request configurations according to an embodiment of the disclosure.

FIG. 2 shows an example of different SR configurations according to an embodiment of the disclosure.

Referring to FIG. 2, an example of the configuration of time/frequency resources for SR transmission through a PUCCH determined by such parameters is shown in FIG. 2.

Furthermore, dsr-TransMax and sr-ProhibitTimer that is transmitted through another IE correspond to parameters providing notification that when the SR signal transmission of a UE is permitted or prohibited. In the LTE system, such parameters are defined as follows.

sr-ProhibitTimer

Timer for SR transmission on PUCCH in TS 36.321 [6]. Value in number of SR period(s) of shortest SR period of any serving cell with PUCCH. Value 0 means that behaviour as specified in 7.3.2 applies. Value 1 corresponds to one SR period, Value 2 corresponds to 2*SR periods and so on. SR period is defined in TS 36.213 [23, table 10.1.5-1].

If an SR is triggered and there is no other SR pending, the MAC entity shall set the SR_COUNTER to 0.

As long as one SR is pending, the MAC entity shall for each TTI:
  if no UL-SCH resources are available for a transmission in this TTI:
    if the MAC entity has no valid PUCCH resource for SR configured in any TTI: initiate a Random Access procedure (see subclause 5.1) on the SpCell and cancel all pending SRs;
    else if the MAC entity has at least one valid PUCCH resource for SR configured for this TTI and if this TTI is not part of a measurement gap or Sidelink Discovery Gap for Transmission and if sr-ProhibitTimer is not running:
    if SR_COUNTER<dsr-TransMax:
    increment SR_COUNTER by 1;
    instruct the physical layer to signal the SR on one valid PUCCH resource for SR;
    start the sr-ProhibitTimer.
  else:
  notify RRC to release PUCCH for all serving cells;
  notify RRC to release SRS for all serving cells;
  clear any configured downlink assignments and uplink grants;
  initiate a Random Access procedure (see subclause 5.1) on the SpCell and cancel all pending SRs.

This is summarized as follows.
  When a medium access control (MAC) entity instructs the physical layer SR transmission, SR_COUNTER increases by 1 and sr-ProhibitTimer starts to operate.
  When sr-ProhibitTimer operates, a UE cannot instruct the physical layer SR transmission.
  Although sr-ProhibitTimer does not operate, when SR_COUNTER reaches a dsr-TransMax value, the UE cannot instruct the physical layer SR transmission.
  Instead, the UE releases a PUCCH and a sounding reference signal (SRS) and does not use allocated downlink (DL) and UL resources. Furthermore, the UE cancels all of standby SRs and performs random access on a base station.

The disclosure proposes an SR procedure necessary for a UE and a base station to perform UL communication using a plurality of TTIs/numerologies/resource indices. To this end, in the disclosure, the following conditions are assumed.
  Two types of TTIs are present: a TTI A and a TTI B
  Four types of LCHs are present: an LCH 1, an LCH 2, an LCH 3, and an LCH 4
  Priority between LCHs: the LCH 1 (highest)>the LCH 2>the LCH 3>the LCH 4 (lowest)
  Two types of SR configurations are present: an SR configuration X and an SR configuration Y In this case, a corresponding relation between an LCH and a TTI may be defined as in Table 6.

TABLE 6

| LCH (1/2/3/4) | TTI (A/B) |
|---|---|
| LCH 1, LCH 2 | can be transmitted TTI A |
| LCH 3, LCH 4 | can be transmitted through TTI A and TTI B |

In Table 6, a corresponding relation between LCHs and a TTI may be expressed as in Table 7 if it is arranged from a TTI viewpoint.

TABLE 7

| TTI (A/B) | LCH (1/2/3/4) |
|---|---|
| TTI A | LCH 1, LCH 2, LCH 3, LCH 4 |
| TTI B | LCH 3, LCH 4 |

\* A corresponding relation between an SR configuration and LCHs may be defined as in Table 8.

TABLE 8

| SR configuration (X/Y) | LCH |
|---|---|
| SR configuration X | LCH 1, LCH 2 |
| SR configuration Y | LCH 3, LCH 4 |

First, the disclosure proposes that a UE will start a procedure under which condition when. As described above, in the LTE system, when the data of a given LCH occurs, if data is now not present in the buffer of a UE or only the data of an LCH having lower priority than an LCH having data, the UE may start a regular BSR, and this leads to the start of an SR procedure. If such a rule is applied to the above condition, the UE starts an SR procedure in the following cases.

(1) If the data of the LCH 1 or LCH 2 or LCH 3 or the LCH 4 occurs in the state in which data is not present in the buffer of the UE, A. when the data of the LCH 1 or the LCH 2 occurs, the UE initiates a regular BSR and thus starts an SR procedure through the SR configuration X.

B. when the data of the LCH 3 or the LCH 4 occurs, the UE initiates a regular BSR and thus starts an SR procedure through the SR configuration Y.

(2) If the data of the LCH 1 occurs when the data of the LCH 2 (the LCH 3 or the LCH 4 in addition to the LCH 2) is present in the buffer of the UE, A. when the data of the LCH 1 occurs, the UE initiates a regular BSR and thus starts an SR procedure through the SR configuration X.

(3) If the data of the LCH 1 or the LCH 2 occurs when the data of the LCH 3 (the LCH 4 in addition to the LCH 3) is present in the buffer of the UE, A. when the data of the LCH 1 or the LCH 2 occurs, the UE initiates a regular BSR and thus starts an SR procedure through the SR configuration X.

(4) If the data of the LCH 1 or LCH 2 or LCH 3 occurs when the data of the LCH 4 is present in the buffer of the UE, A. when the data of the LCH 1 or LCH 2 occurs, the UE initiates a regular BSR and thus starts an SR procedure through the SR configuration X.

B. when the data of the LCH 3 occurs, the UE initiates a regular BSR and thus starts an SR procedure through the SR configuration Y.

In this case, the reason why the base station uses a plurality of SR configurations, that is, the SR configuration X and the SR configuration Y, is for identifying that the data of the LCH 1 or the LCH 2 has occurred in the UE that has transmitted an SR signal when the base station receives the SR signal through the SR configuration X and for allocating UL resources consisting of the TTI A suitable for transmitting/receiving the data. Furthermore, the reason for this is that the base station identifies that the data of the LCH 3 or the LCH 4 has occurred in the UE that has transmitted an SR signal when the base station receives the SR signal through the SR configuration Y and allocates UL resources consisting of the TTI A or the TTI B suitable for transmitting/receiving the data.

In the following case, however, an operation unsuitable for an intention of a base station to operate a plurality of SR configurations is performed.

Unlike the LCH 1 and the LCH 2, the LCH 3 and the LCH 4 are capable of UL transmission/reception through the TTI B in addition to the TTI A. Accordingly, when the data of the LCH 3 or the LCH 4 occurs, although the data of the LCH 1 or the LCH 2 is already present in the buffer of the UE, the SR transmission of the UE through the SR configuration Y needs to be permitted. However, in accordance with the regular BSR start condition defined in LTE, if the data of an LCH having high priority is already present in the buffer of the UE, a regular BSR is not initiated and thus an SR is not transmitted.

In order to solve this problem, the disclosure proposes a regular BSR start condition in which the use of a plurality of TTIs/numerologies/resource indices is considered.

Figure 3:
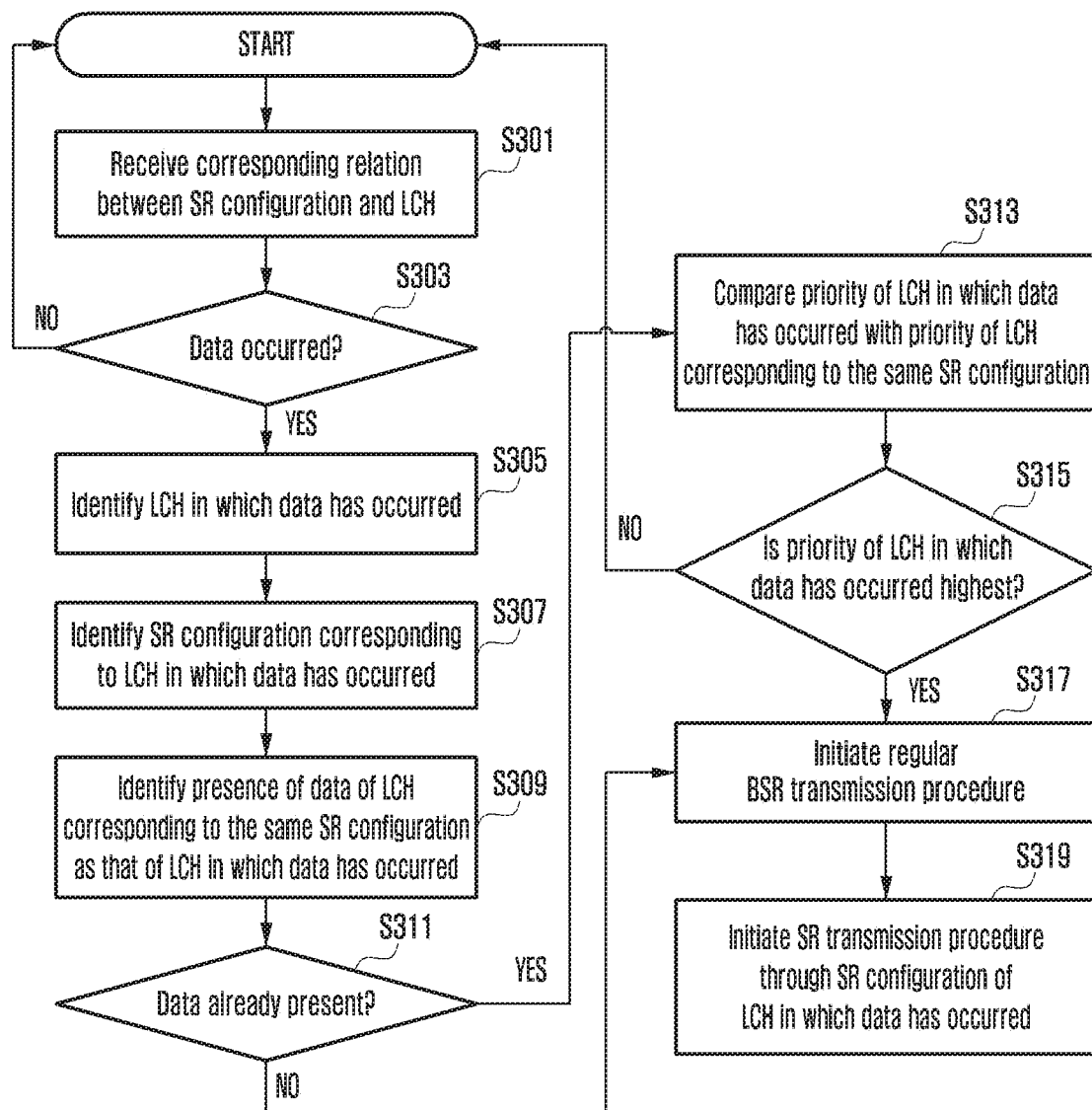
FIG. 3 shows an operation of a proposed scheme 1 according to an embodiment of the disclosure.

FIG. 3 shows an operation of a proposed scheme 1 according to an embodiment of the disclosure.

Referring to FIG. 3, a proposed scheme 1 according to a first embodiment operates as follows.

1. In operation S301, a base station provides a UE with a corresponding relation between an SR configuration and an LCH.

A. As described above, the corresponding relation may be defined as in Table 9. The corresponding relation of Table 9 may be transmitted through SchedulingRequestConfig or LogicalChannelConfig of a radio resource control (RRC) IE.

TABLE 9

| SR configuration (X/Y/Z) | LCH (1/2/3/4/5/6/7/8) |
|---|---|
| SR configuration X | LCH 1, LCH 2 |
| SR configuration Y | LCH 3, LCH 4 |
| SR configuration Z | LCH 5, LCH 6, LCH 7, LCH 8 |

2. In operation S303, when data occurs in a given LCH, in operation S305, the UE identifies an LCH corresponding to an SR configuration, such as the corresponding LCH.

In operation S307, the UE Identifies SR configuration corresponding to LCH in which data has occurred. In operations S309 and S311, the UE Identifies presence of data of LCH corresponding to the same SR configuration as that of LCH in which data has occurred.

A. For example, when data occurs in the LCH 1, the UE identifies that LCHs corresponding to an SR configuration X include the LCH 1 and the LCH 2.

B. Furthermore, when data occurs in an LCH 8, the UE identifies that LCHs corresponding to an SR configuration Z include the LCH 5, the LCH 6, the LCH 7 and the LCH 8.

3. In operation S313, the UE compares (a) priority of an LCH in which data has occurred with (b) priority of an LCH that belongs to LCHs corresponding to the same SR configuration as that identified in the second step and whose data is now present in the buffer of the UE.

A. In operation S315, if the priority of the LCH in which data has occurred, that is, (a), is higher than the priority of the LCH that belongs to the LCHs corresponding to the same SR configuration and whose data is now present in the buffer of the UE, in operation S317, the UE initiates a regular BSR.

In operation S319, the UE initiates SR transmission procedure through SR configuration of LCH in which data has occurred.

i. The initiated regular BSR initiates an SR transmission procedure through the SR configuration corresponding to the LCH in which data has occurred.

ii. For example, it is considered that priority is higher in order of the LCH 1, LCH 2, LCH 3, LCH 4, LCH 5, LCH 6, LCH 7 and LCH 8. Furthermore, it is considered that data has occurred in the LCH 1. The LCH 1 corresponds to the SR configuration X, and the LCH 2 also corresponds to the SR configuration X. In this case, when the data of the LCH 2 is already present in the buffer of the UE, the UE initiates a regular BSR because priority of the LCH 1 is higher than priority of the LCH 2. Furthermore, the initiated regular BSR initiates an SR transmission procedure through the SR configuration X.

iii. At this time, the UE does not consider an LCH other than an LCH corresponding to the same SR configuration as the LCH in which data has occurred. When data occurs in the LCH 1 as in the above example, the LCH 3, LCH 4, LCH 5, LCH 6, LCH 7 and LCH 8 other than the LCH 2 do not affect whether the UE will initiate the regular BSR.

B. If the priority of the LCH in which data has occurred, that is, (a), is equal to or lower than the priority of the LCH that belongs to the LCHs corresponding to the same SR configuration and whose data is now present in the buffer of the UE, that is, (b), the UE does not initiate a regular BSR.

i. For example, it is considered that priority is higher in order of the LCH 1, LCH 2, LCH 3, LCH 4, LCH 5, LCH 6, LCH 7 and LCH 8. Furthermore, it is considered that data has occurred in the LCH 2. The LCH 2 corresponds to the SR configuration X, and the LCH 1 also corresponds to the SR configuration X. In this case, if the data of the LCH 1 is already present in the buffer of the UE, the UE does not initiate a regular BSR because the priority of the LCH 2 is lower than the priority of the LCH 1.

ii. At this time, the UE does not consider an LCH other than an LCH corresponding to the same SR configuration as an LCH in which data has occurred. When data occurs in the LCH 2 as in the above example, the LCH 3, LCH 4, LCH 5, LCH 6, LCH 7 and LCH 8 other than the LCH 1 do not affect whether the UE will initiate the regular BSR.

C. If the data of an LCH corresponding to the same SR configuration as an LCH in which data has occurred is not present in the buffer of the UE, the UE initiates a regular BSR.

i. The initiated regular BSR initiates an SR transmission procedure through an SR configuration corresponding to the LCH in which data has occurred.

ii. For example, it is considered that priority is higher in order of the LCH 1, LCH 2, LCH 3, LCH 4, LCH 5, LCH 6, LCH 7 and LCH 8. Furthermore, it is considered that data has occurred in the LCH 8. The LCH 8 corresponds to the SR configuration Z, and the LCH 5, LCH 6, and LCH 7 also correspond to the SR configuration Z. In this case, if the data of the LCH 5, LCH 6, and LCH 7 is not present in the buffer of the UE, the UE initiates a regular BSR. Furthermore, the initiated regular BSR initiates an SR transmission procedure through the SR configuration Z.

iii. At this time, the UE does not consider an LCH other than an LCH corresponding to the same SR configuration as the LCH in which data has occurred. When data occurs in the LCH 8 as in the above example, the LCH 1, LCH 2, LCH 3 and LCH 4 other than the LCH 5, LCH 6 and LCH 7 do not affect whether the UE will initiate the regular BSR.

The operation of the proposed scheme 1 according to the first embodiment has been described above.

Figure 4:
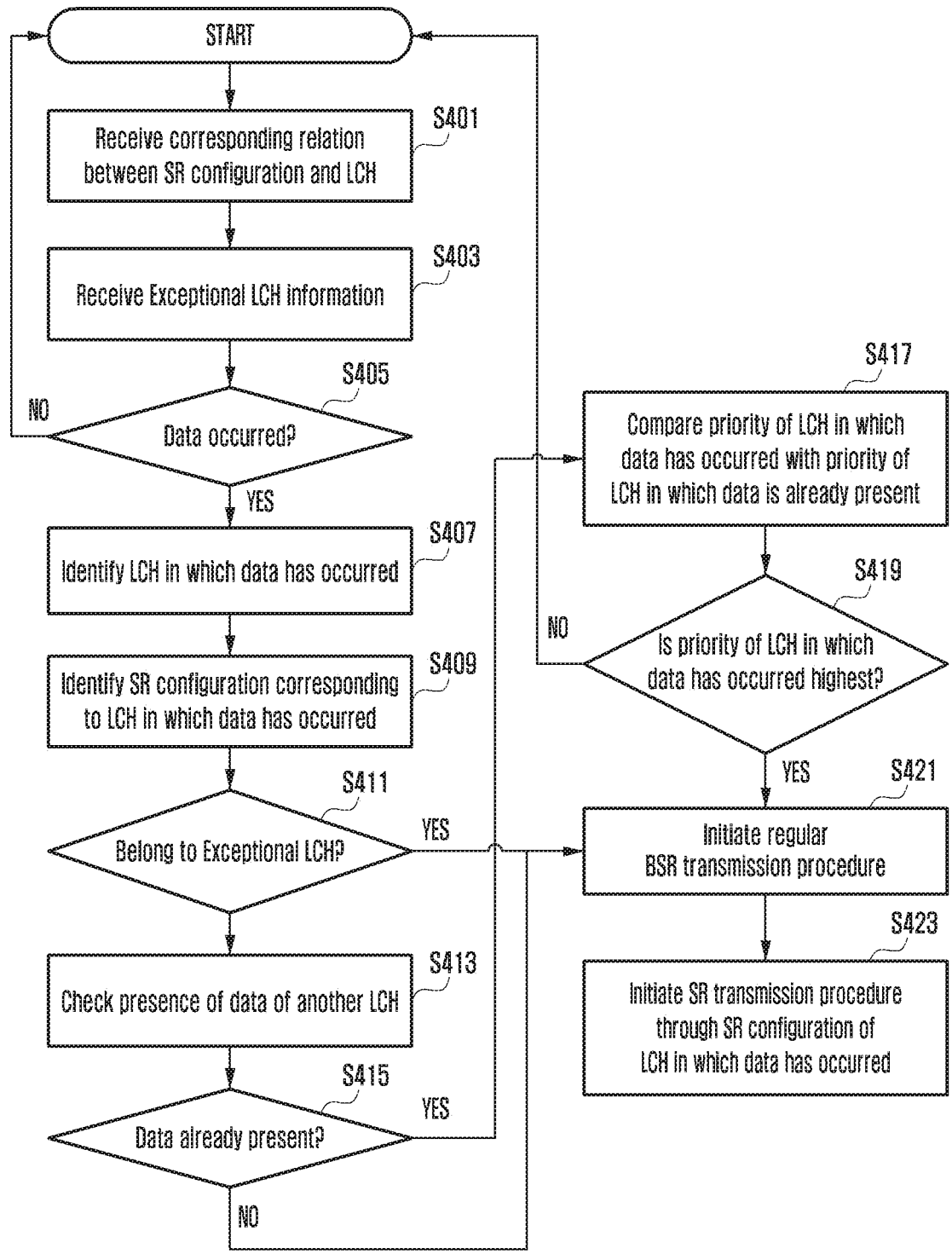
FIG. 4 shows an operation of a proposed scheme 2 according to an embodiment of the disclosure.

FIG. 4 shows an operation of a proposed scheme 2 according to an embodiment of the disclosure.

Referring to FIG. 4, a proposed scheme 2 according to a second embodiment is described below.

1. In operation S401, a base station provides a UE with a corresponding relation between an SR configuration and an LCH.

A. As described above, an example of the corresponding relation may be defined as in Table 10. The corresponding relation may be transmitted through SchedulingRequest-Config or LogicalChannelConfig of an RRC IE.

TABLE 10

| SR configuration (X/Y/Z) | LCH (1/2/3/4/5/6/7/8) |
|---|---|
| SR configuration X | LCH 1, LCH 2 |
| SR configuration Y | LCH 3, LCH 4 |
| SR configuration Z | LCH 5, LCH 6, LCH 7, LCH 8 |

2. Furthermore, in operation S403, the base station provides the UE with an LCH list through which a regular BSR can be initiated regardless of priority between LCHs. For convenience sake, such an LCH is called an exceptional LCH.

A. An example of such a list may be defined as in Table 11. This may be transmitted through SchedulingRequest-Config or LogicalChannelConfig of an RRC IE.

TABLE 11

| Exceptional LCH | LCH 3, LCH 4, LCH 8 |
|---|---|

In operations S405 and S407, the UE identifies LCH in which data has occurred. In operation S409, the UE identifies SR configuration corresponding to LCH in which data.

3. In operation S411, the UE identifies whether a given LCH belongs to an exceptional LCH provided by the base station when data occurs in the given LCH. In operations S413 and S415, the UE checks presence of data of another LCH.

A. If the LCH in which data has occurred does not correspond to the exceptional LCH, in operation S417, the UE compares (c) the priority of the LCH in which data has occurred with (d) priority of an LCH whose data is present in the buffer of the UE.

i. In operation S419, if the priority of the LCH in which data has occurred, that is, (c), is higher than priority of an LCH whose data is now present in the buffer of the UE, that is, (d), In operation S421, the UE initiates a regular BSR. In operation S423, the UE initiates an SR transmission procedure through an SR configuration corresponding to the LCH in which data has occurred.

(1). For example, it is considered that priority is higher in order of the LCH 1, LCH 2, LCH 3, LCH 4, LCH 5, LCH 6, LCH 7 and LCH 8. Furthermore, it is considered that data has occurred in the LCH 5. In this case, if only the data of the LCH 6 or LCH 7 or LCH 8 is present in the buffer of the UE, the UE initiates a regular BSR because the priory of the LCH 5 is higher than the priority of the LCH whose data is now present in the buffer. The initiated regular BSR initiates an SR transmission procedure through the SR configuration Z corresponding to the LCH 5.

ii. If the priority of the LCH in which data has occurred, that is, (c), is equal to or lower than priority of an LCH whose data is now present in the buffer of the UE, that is, (d), the UE does not initiate a regular BSR.

(1). For example, it is considered that priority is higher in order of the LCH 1, LCH 2, LCH 3, LCH 4, LCH 5, LCH 6, LCH 7 and LCH 8. Furthermore, it is considered that data has occurred in the LCH 5. In this case, if the data of the LCH 1 or LCH 2 or LCH 3 or LCH 4 or LCH 5 is present in the buffer of the UE, UE does not initiate a regular BSR because the priority of the LCH 5 is equal to or lower than the priority of the LCH in which data is now present in the buffer.

iii. If data is now not present in the buffer of the UE, the UE initiates a regular BSR. The initiated regular BSR initiates an SR transmission procedure through an SR configuration corresponding to the LCH in which data has occurred.

(1). For example, it is considered that priority is higher in order of the LCH 1, LCH 2, LCH 3, LCH 4, LCH 5, LCH 6, LCH 7 and LCH 8. Furthermore, it is considered that data has occurred in the LCH 5. In this case, if data is not present in the buffer of the UE, the UE initiates a regular BSR. The initiated regular BSR initiates an SR transmission procedure through the SR configuration Z corresponding to the LCH B. If an LCH in which data has occurred corresponds to an exceptional LCH, the UE initiates a regular BSR regardless of priority between LCHs. The initiated regular BSR initiates an SR transmission procedure through an SR configuration corresponding to the LCH in which data has occurred.

(1). For example, it is considered that priority is higher in order of the LCH 1, LCH 2, LCH 3, LCH 4, LCH 5, LCH 6, LCH 7 and LCH 8. Furthermore, it is considered that data has occurred in the LCH 4. The LCH 4 corresponds to an exceptional LCH. Accordingly, although the data of the LCH 1 or LCH 2 or LCH 3 having higher priority than the LCH 4 is now present in the buffer of the UE, the UE initiates a regular BSR. The initiated regular BSR initiates an SR transmission procedure through the SR configuration Y corresponding to the LCH 4.

The operation of the proposed scheme 2 according to the second embodiment has been described above.

Figure 5:
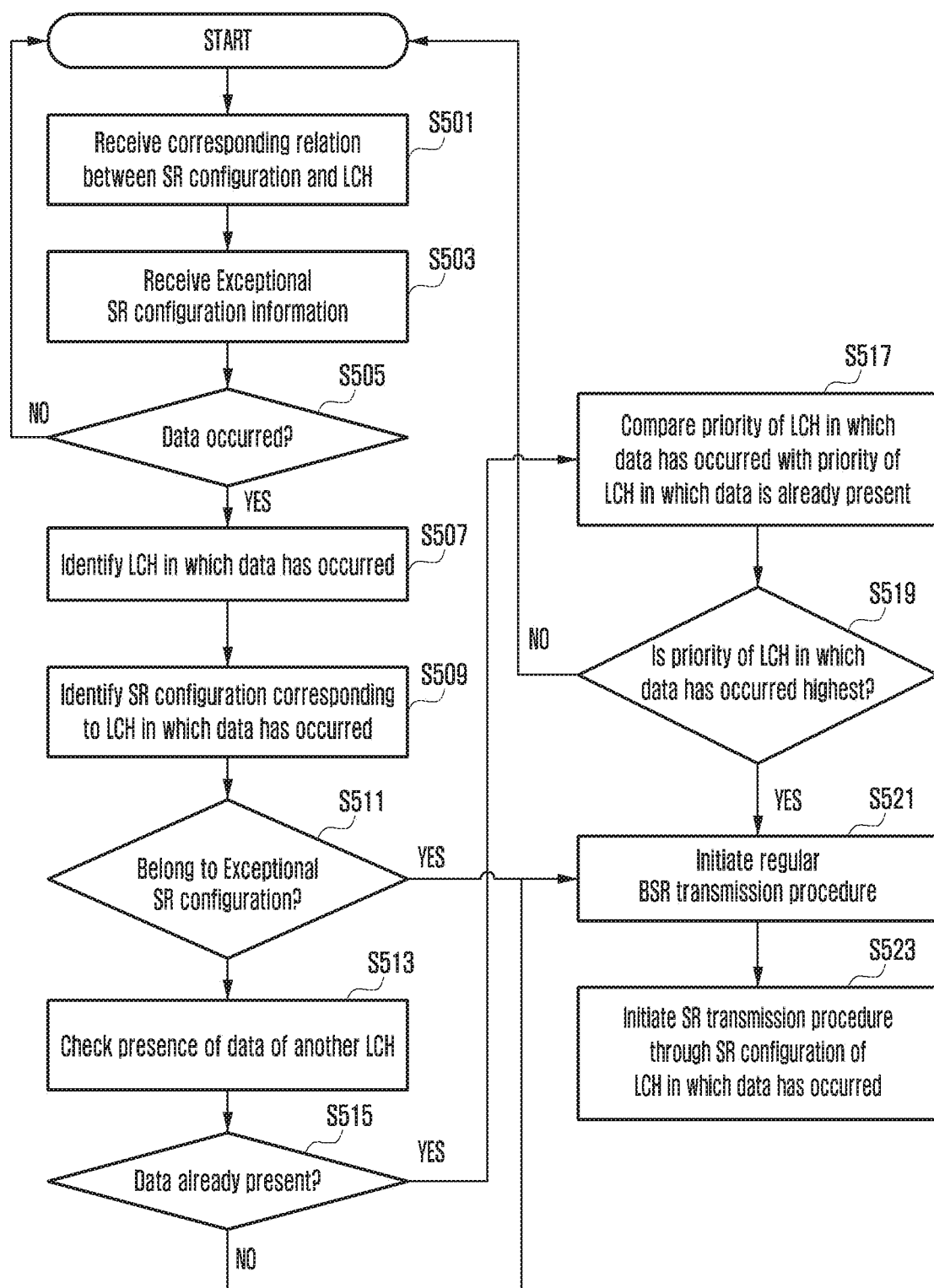
FIG. 5 shows an operation of a proposed scheme 3 according to an embodiment of the disclosure.

FIG. 5 shows an operation of a proposed scheme 3 according to an embodiment of the disclosure.

Referring to FIG. 5, an operation of the proposed scheme 3 according to a third embodiment is described below.

1. In operation S501, a base station provides a UE with a corresponding relation between an SR configuration and an LCH.

A. As described above, an example of the corresponding relation may be defined as in Table 12. The corresponding relation may be transmitted through SchedulingRequest-Config or LogicalChannelConfig of an RRC IE.

TABLE 12

| SR configuration (X/Y/Z) | LCH (1/2/3/4/5/6/7/8) |
| --- | --- |
| SR configuration X | LCH 1, LCH 2 |
| SR configuration Y | LCH 3, LCH 4 |
| SR configuration Z | LCH 5, LCH 6, LCH 7, LCH 8 |

2. Furthermore, in operation S503, the base station provides the UE with an SR configuration list in which LCHs capable of initiating a regular BSR correspond to each other regardless of priority between LCHs. For convenience sake, such an SR configuration is called an exceptional SR configuration.

A. An example of the list may be defined as in Table 13. The list may be transmitted through SchedulingRequestConfig of an RRC IE.

TABLE 13

| Exceptional SR configuration | SR configuration Y |
| --- | --- |

3. In operations S505, S507, S509, and S511, when data occurs in a given LCH, the UE identifies an SR configuration corresponding to the given LCH and identifies whether the SR configuration belongs to an exceptional SR configuration. In operations S513 and S515, the UE checks presence of data of another LCH.

A. If an LCH in which data has occurred does not correspond to an exceptional SR configuration, in operation S517, the UE comprises (e) the priority of the LCH in which data has occurred with (f) priority of an LCH whose data is present in the buffer of the UE.

i. In operation S519, if the priority of the LCH in which data has occurred, that is, (e), is higher than the priority of the LCH whose data is now present in the buffer of the UE, that is, (f), in operation S521 the UE initiates a regular BSR. In operation S523, the UE initiates an SR transmission procedure through an SR configuration corresponding to the LCH in which data has occurred.

(1). For example, it is considered that priority is higher in order of the LCH 1, LCH 2, LCH 3, LCH 4, LCH 5, LCH 6, LCH 7 and LCH 8. Furthermore, it is considered that data has occurred in the LCH 5. The LCH 5 corresponds to the SR configuration Z, and the SR configuration Z does not correspond to an exceptional SR configuration. Accordingly, if the data of the LCH 6 or LCH 7 or LCH 8 has only to be present in the buffer of the UE, the UE initiates a regular BSR because the priority of the LCH 5 is higher than the priority of the LCH in which data is now present in the buffer. The initiated regular BSR initiates an SR transmission procedure through the SR configuration Z corresponding to the LCH 5.

ii. If the priority of the LCH in which data has occurred, that is, (e), is equal to or lower than the priority of the LCH whose data is now present in the buffer of the UE, that is, (f), the UE does not initiate a regular BSR.

(1). For example, it is considered that priority is higher in order of the LCH 1, LCH 2, LCH 3, LCH 4, LCH 5, LCH 6, LCH 7 and LCH 8. Furthermore, it is considered that data has occurred in the LCH 5. The LCH 5 corresponds to the SR configuration Z, and the SR configuration Z does not correspond to an exceptional SR configuration. Accordingly, if the data of the LCH 1 or LCH 2 or LCH 3 or LCH 4 or LCH 5 is present in the buffer of the UE, the UE does not initiate a regular BSR because the priority of the LCH 5 is equal to or lower than the priority of the LCH whose data is now present in the buffer.

iii. If data is now not present in the buffer of the UE, the UE initiates a regular BSR. The initiated regular BSR initiates an SR transmission procedure through an SR configuration corresponding to the LCH in which data has occurred.

(1). For example, it is considered that priority is higher in order of the LCH 1, LCH 2, LCH 3, LCH 4, LCH 5, LCH 6, LCH 7 and LCH 8. Furthermore, it is considered that data has occurred in the LCH 5. The LCH 5 corresponds to the SR configuration Z, and the SR configuration Z does not correspond to an exceptional SR configuration. Accordingly, if data is not present in the buffer of the UE, the UE initiates a regular BSR. The initiated regular BSR initiates an SR transmission procedure through the SR configuration Z corresponding to the LCH 5.

B. If an LCH in which data has occurred corresponds to an exceptional SR configuration, the UE initiates a regular BSR regardless of priority between LCHs. The initiated regular BSR initiates an SR transmission procedure an exceptional SR configuration corresponding to the LCH in which data has occurred.

(1). For example, it is considered that priority is higher in order of the LCH 1, LCH 2, LCH 3, LCH 4, LCH 5, LCH 6, LCH 7 and LCH 8. Furthermore, it is considered that data has occurred in the LCH 4. The LCH 4 corresponds to the SR configuration Y, and the SR configuration Y corresponds to an exceptional SR configuration. Accordingly, although the data of the LCH 1 or LCH 2 or LCH 3 having higher priority than the LCH 4 is now present in the buffer of the UE, the UE initiates a regular BSR. The initiated regular BSR initiates an SR transmission procedure through the SR configuration Y, that is, an exceptional SR configuration corresponding to the LCH 4.

The operation of the proposed scheme 3 according to the third embodiment has been described above.

Figure 6:
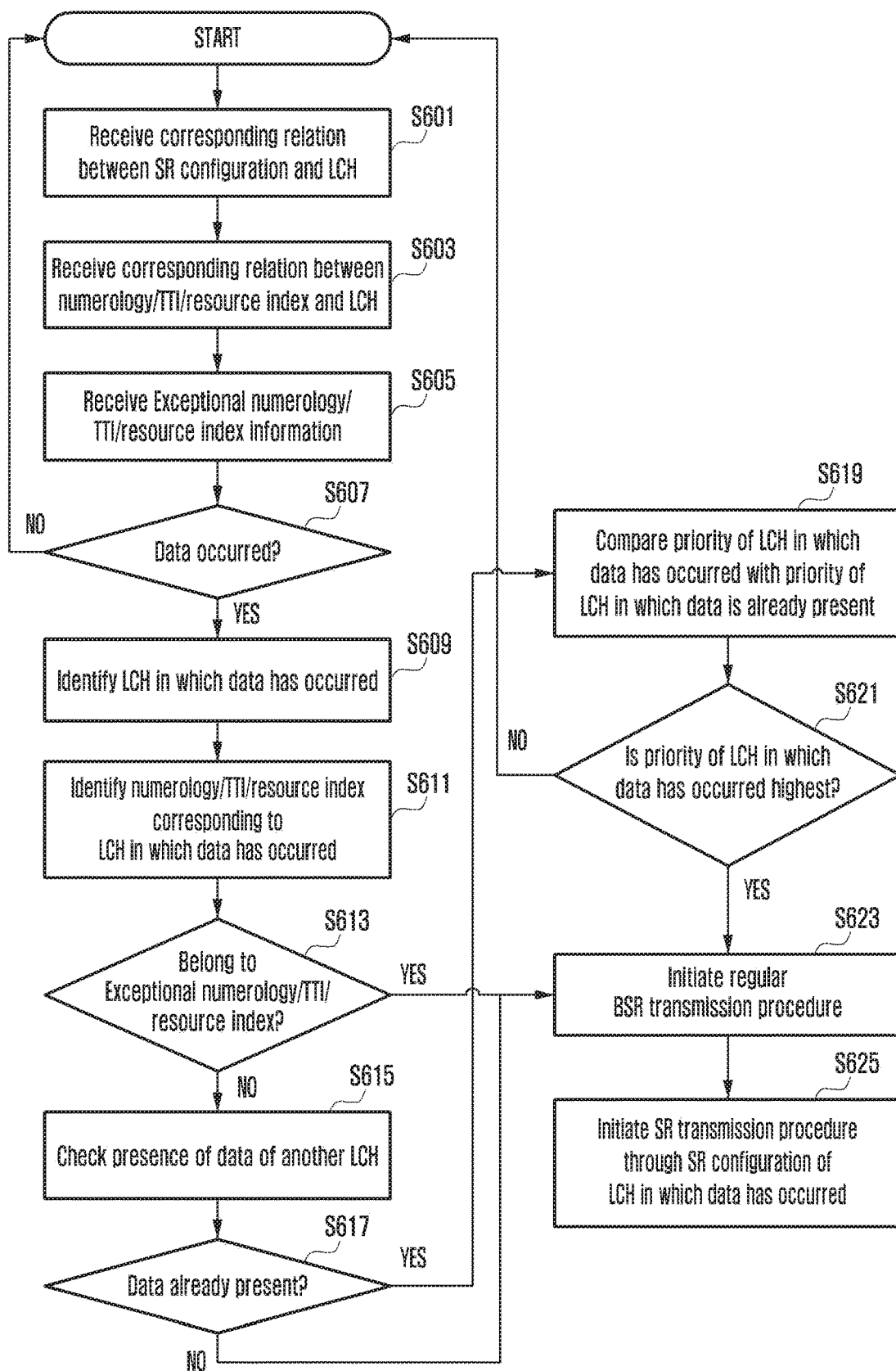
FIG. 6 shows an operation of proposed schemes 4/5/6/7 according to an embodiment of the disclosure.

FIG. 6 shows an operation of proposed schemes 4/5/6/7 according to an embodiment of the disclosure.

Referring to FIG. 6, an operation of a proposed scheme 4 according to a fourth embodiment is described below.

1. In operation S603, a base station provides a UE with a corresponding relation between an LCH and a TTI/numerology/resource index.

A. As described above, an example of the corresponding relation may be defined as in Table 14. The corresponding relation may be transmitted through LogicalChannelConfig of an RRC IE.

TABLE 14

| LCH (1/2/3/4) | TTI type (A/B) | Numerology type (a/b) | Corresponding relation (transmission possible/impossible) |
| --- | --- | --- | --- |
| LCH 1 | TTI A | Numerology a | O |
|  |  | Numerology b | O |
|  | TTI B | Numerology a | O |
|  |  | Numerology b | X |
| LCH 2 | TTI A | Numerology a | O |
|  |  | Numerology b | O |
|  | TTI B | Numerology a | X |
|  |  | Numerology b | X |
| LCH 3 | TTI A | Numerology a | X |
|  |  | Numerology b | X |
|  | TTI B | Numerology a | O |
|  |  | Numerology b | O |
| LCH 4 | TTI A | Numerology a | X |
|  |  | Numerology b | X |
|  | TTI B | Numerology a | X |
|  |  | Numerology b | O |

2. In operation S601, the base station provides the UE with a corresponding relation between an SR configuration and an LCH.

A. As described above, an example of the corresponding relation may be defined as in Table 15. The corresponding relation may be transmitted through SchedulingRequest-Config or LogicalChannelConfig of an RRC IE.

TABLE 15

| SR configuration (X/Y/Z) | LCH (1/2/3/4/5/6/7/8) |
| --- | --- |
| SR configuration X | LCH 1, LCH 2 |
| SR configuration Y | LCH 3, LCH 4 |
| SR configuration Z | LCH 5, LCH 6, LCH 7, LCH 8 |

3. Furthermore, in operation S605, when data occurs in an LCH capable of transmission/reception through a given TTI, the base station provides the UE with a TTI list in which such an operation is permitted in order for the UE to initiate a regular BSR regardless of priority between LCHs. For convenience sake, such a TTI is called an exceptional TTI.

A. An example of the list is the same as Table 16. The list may be transmitted through an RRC IE.

TABLE 16

| Exceptional TTI | TTI B |
| --- | --- |

4. In operations S607, S609, S611, and S613, when data occurs in a given LCH, the UE identifies a TTI in which the data of the given LCH can be transmitted/received, and identifies whether an exceptional TTI is present in the TTI.

In operations S615 and S617, the UE checks presence of data of another LCH.

A. If the LCH in which data has occurred cannot use an exceptional TTI, in operation S619, the UE compares the priority of the LCH in which data has occurred with priority of an LCH whose data is present in the buffer of the UE.

i. In operation S621, if the priority of the LCH in which data has occurred is higher than the priority of the LCH whose data is now present in the buffer of the UE, in operation S623, the UE initiates a regular BSR. In operation S625, The UE initiates an SR transmission procedure through an SR configuration corresponding to the LCH in which data has occurred.

ii. If the priority of the LCH in which data has occurred is equal to or lower than the priority of the LCH whose data is now present in the buffer of the UE, the UE does not initiate a regular BSR.

iii. If data is now not present in the buffer of the UE, the UE initiates a regular BSR. The initiated regular BSR initiates an SR transmission procedure through an SR configuration corresponding to the LCH in which data has occurred.

B. If the LCH in which data has occurred can use an exceptional TTI, the UE initiates a regular BSR regardless of priority between LCHs. The initiated regular BSR initiates an SR transmission procedure through an SR configuration corresponding to the LCH in which data has occurred.

The operation of the proposed scheme 4 according to the fourth embodiment has been described above.

FIG. 6 shows an operation of proposed schemes 4/5/6/7 according to an embodiment of the disclosure.

Referring to FIG. 6, an operation of a proposed scheme 5 according to a fifth embodiment is described below.

1. In operation S603, a base station provides a UE with a corresponding relation between an LCH and a TTI/numerology/resource index.

A. The corresponding relation may be transmitted through LogicalChannelConfig of an RRC IE.

2. In operation S601, the base station provides the UE with a corresponding relation between an SR configuration and an LCH.

A. The corresponding relation may be transmitted through SchedulingRequestConfig or LogicalChannelConfig of an RRC IE.

3. Furthermore, when data occurs in an LCH capable of transmission/reception through a given numerology, in operation S605, the base station provides the UE with a numerology list in which such an operation is permitted in order for the UE to initiate a regular BSR regardless of priority between LCHs. For convenience sake, such numerology is called an exceptional numerology.

A. An example of the list may be defined as in Table 17. The list may be transmitted through an RRC IE.

TABLE 17

| Exceptional numerology | Numerology b |
| --- | --- |

4. In operations S607, S609, S611, and S613, when data occurs in a given LCH, the UE identifies numerology in which the data of the given LCH can be transmitted/received, and identifies whether exceptional numerology is present in the numerology. In operations S615 and S617, the UE checks presence of data of another LCH.

A. If the LCH in which data has occurred cannot use exceptional numerology, in operation S619, the UE compares the priority of the LCH in which data has occurred with priority of an LCH whose data is present in the buffer of the UE.

i. In operation S621, if the priority of the LCH in which data has occurred is higher than the priority of the LCH whose data is now present in the buffer of the UE, in operation S623, the UE initiates a regular BSR. In operation S625, the UE initiates an SR transmission procedure through an SR configuration corresponding to the LCH in which data has occurred.

ii. If the priority of the LCH in which data has occurred is equal to or lower than the priority of the LCH whose data is now present in the buffer of the UE, the UE does not initiate a regular BSR.

iii. If data is now not present in the buffer of the UE, the UE initiates a regular BSR. The initiated regular BSR initiates an SR transmission procedure through an SR configuration corresponding to the LCH in which data has occurred.

B. If the LCH in which data has occurred can use exception numerology, the UE initiates a regular BSR regardless of priority between LCHs. The initiated regular BSR initiates an SR transmission procedure through an SR configuration corresponding to the LCH in which data has occurred.

The operation of the proposed scheme 5 according to the fifth embodiment has been described above.

FIG. 6 shows an operation of proposed schemes 4/5/6/7 according to an embodiment of the disclosure.

An operation of a proposed scheme 6 according to a sixth embodiment is described below.

1. In operation S603, a base station provides a UE with a corresponding relation between an LCH and a TTI/numerology/resource index.

A. An example of the corresponding relation may be defined as in Table 18. The corresponding relation may be transmitted through LogicalChannelConfig of an RRC IE.

TABLE 18

| LCH (1/2/3/4) | Resource index type (i/j/k) | Corresponding relation (transmission possible/impossible) |
| --- | --- | --- |
| LCH 1 | Resource index i | ○ |
|  | Resource index j | X |
|  | Resource index k | X |
| LCH 2 | Resource index i | X |
|  | Resource index j | ○ |
|  | Resource index k | X |
| LCH 3 | Resource index i | X |
|  | Resource index j | X |
|  | Resource index k | ○ |
| LCH 4 | Resource index i | ○ |
|  | Resource index j | ○ |
|  | Resource index k | X |

2. In operation S601, the base station provides the UE with a corresponding relation between an SR configuration and an LCH.

A. The corresponding relation may be transmitted through SchedulingRequestConfig or LogicalChannelConfig of an RRC IE.

3. Furthermore, when data occurs in an LCH capable of transmission/reception through a given resource index, in operation S605, the base station provides the UE with a resource index list in which such an operation is permitted in order for the UE to initiate a regular BSR regardless of priority between LCHs. For convenience sake, such a resource index is called an exceptional resource index.

A. An example of the list may be defined as in Table 19. The list may be transmitted through an RRC IE.

TABLE 19

| Exceptional resource index | Resource index j |
| --- | --- |

4. In operations S607, S609, S611, and S613, when data occurs in a given LCH, the UE identifies a resource index in which the data of the given LCH can be transmitted/received, and identifies whether an exceptional resource index is present in the resource index.

In operations S615 and S617, the UE checks presence of data of another LCH.

A. If an LCH in which data has occurred cannot use an exceptional resource index, in operation S619, the UE compares the priority of the LCH in which data has occurred with the priority of an LCH whose data is present in the buffer of the UE.

i. In operation S621, if the priority of the LCH in which data has occurred is higher than the priority of the LCH whose data is now present in the buffer of the UE, in operation S623, the UE initiates a regular BSR. In operation S625, the UE initiates an SR transmission procedure through an SR configuration corresponding to the LCH in which data has occurred.

ii. If the priority of the LCH in which data has occurred is equal to or lower than the priority of the LCH whose data is now present in the buffer of the UE, the UE does not initiate a regular BSR.

iii. If data is now not present in the buffer of the UE, the UE initiates a regular BSR. The initiated regular BSR initiates an SR transmission procedure through an SR configuration corresponding to the LCH in which data has occurred.

B. If the LCH in which data has occurred can use an exception resource index, the UE initiates a regular BSR regardless of priority between LCHs. The initiated regular BSR initiates an SR transmission procedure through an SR configuration corresponding to the LCH in which data has occurred.

The operation of the proposed scheme 6 according to the sixth embodiment has been described above.

FIG. 6 shows an operation of proposed schemes 4/5/6/7 described in the disclosure.

An operation of a proposed scheme 7 according to the seventh embodiment is described below.

1. In operation S603, a base station provides a UE with a corresponding relation between an LCH and a TTI/numerology/resource index.

A. As described above, an example of the corresponding relation may be defined as in Table 20. The corresponding relation may be transmitted through LogicalChannelConfig of an RRC IE.

TABLE 20

| LCH (1/2/3/4) | TTI type (A/B) | Numerology type (a/b) | Corresponding relation (transmission possible/impossible) |
|---|---|---|---|
| LCH 1 | TTI A | Numerology a | O |
|  |  | Numerology b | O |
|  | TTI B | Numerology a | O |
|  |  | Numerology b | X |
| LCH 2 | TTI A | Numerology a | O |
|  |  | Numerology b | O |
|  | TTI B | Numerology a | X |
|  |  | Numerology b | X |
| LCH 3 | TTI A | Numerology a | X |
|  |  | Numerology b | X |
|  | TTI B | Numerology a | O |
|  |  | Numerology b | O |
| LCH 4 | TTI A | Numerology a | X |
|  |  | Numerology b | X |
|  | TTI B | Numerology a | X |
|  |  | Numerology b | O |

2. In operation S601, the base station provides the UE with a corresponding relation between an SR configuration and an LCH.

A. As described above, an example of the corresponding relation may be defined as in Table 21. The corresponding relation may be transmitted through SchedulingRequestConfig or LogicalChannelConfig of an RRC IE.

TABLE 21

| SR configuration (X/Y/Z) | LCH (1/2/3/4/5/6/7/8) |
|---|---|
| SR configuration X | LCH 1, LCH 2 |
| SR configuration Y | LCH 3, LCH 4 |
| SR configuration Z | LCH 5, LCH 6, LCH 7, LCH 8 |

3. Furthermore, when data occurs in an LCH capable of transmission/reception through a given TTI and given numerology, in operation 605, the base station provides the UE with a list of combinations of TTIs and numerologies in which such an operation is permitted in order for the UE to initiate a regular BSR regardless of priority between LCHs. For convenience sake, such a combination of a TTI and numerology is called an exceptional TTI/numerology.

A. An example of the list may be defined as in Table 22. The list may be transmitted through an RRC IE.

TABLE 22

| Exceptional TTI/numerology | (TTI A, numerology b) |
|---|---|
|  | (TTI B, numerology a) |

4. In operations S607, S609, S611, and S613, when data occurs in a given LCH, the UE identifies a combination of a TTI and numerology in which the data of the data of the given LCH can be transmitted/received, and identifies whether an exceptional TTI/numerology is present in the combination.

In operations S615 and S617, the UE checks presence of data of another LCH.

A. If the LCH in which data has occurred cannot use an exceptional TTI/numerology, in operation S619, the UE compares the priority of the LCH in which data has occurred with the priority of an LCH whose data is present in the buffer of the UE.

i. In operation S621, if the priority of the LCH in which data has occurred is higher than the priority of the LCH whose data is now present in the buffer of the UE, in operation S623, the UE initiates a regular BSR. In operation S625, the UE initiates an SR transmission procedure through an SR configuration corresponding to the LCH in which data has occurred.

ii. If the priority of the LCH in which data has occurred is equal to or lower than the priority of the LCH whose data is now present in the buffer of the UE, the UE does not initiate a regular BSR.

iii. If data is now not present in the buffer of the UE, the UE initiates a regular BSR. The initiated regular BSR initiates an SR transmission procedure through an SR configuration corresponding to the LCH in which data has occurred.

B. If the LCH in which data has occurred can use an exception TTI/numerology, the UE initiates a regular BSR regardless of priority between LCHs. The initiated regular BSR initiates an SR transmission procedure through an SR configuration corresponding to the LCH in which data has occurred.

The operation of the proposed scheme 7 according to the seventh embodiment has been described above.

Figure 7:
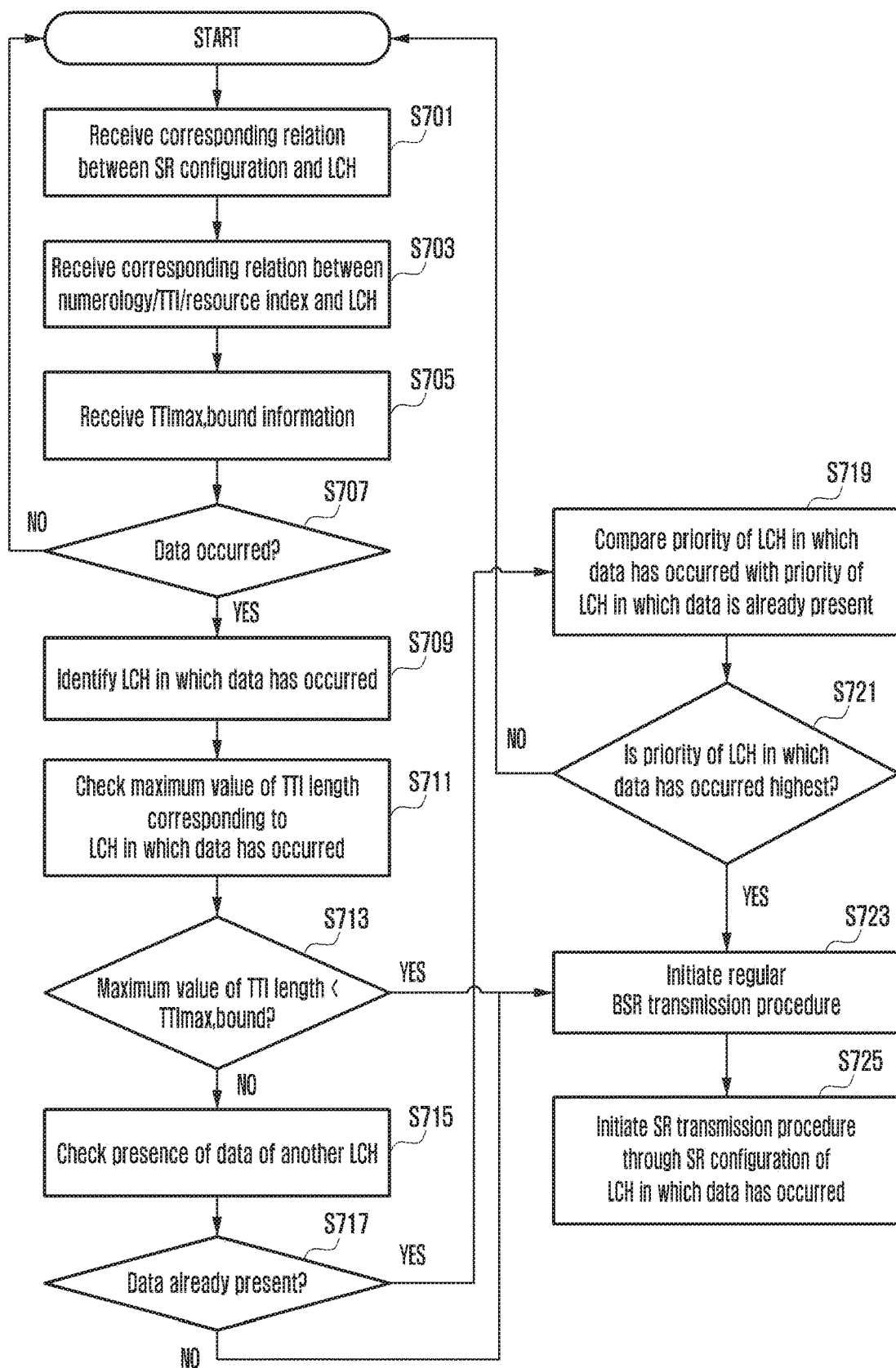
FIG. 7 shows an operation of a proposed scheme 8 according to an embodiment of the disclosure.

FIG. 7 shows an operation of a proposed scheme 8 according to an embodiment of the disclosure.

Referring to FIG. 7, an operation of a proposed scheme 8 according to an eighth embodiment is described below.

1. In operation S703, a base station provides a UE with a corresponding relation between an LCH and a TTI/numerology/resource index.

A. As described above, an example of the corresponding relation may be defined as in Table 23. The corresponding relation may be transmitted through LogicalChannelConfig of an RRC IE.

TABLE 23

| LCH (1/2/3/4) | TTI type (A/B) | Numerology type (a/b) | Corresponding relation (transmission possible/impossible) |
|---|---|---|---|
| LCH 1 | TTI A | Numerology a | O |
|  |  | Numerology b | O |
|  | TTI B | Numerology a | O |
|  |  | Numerology b | X |
| LCH 2 | TTI A | Numerology a | O |
|  |  | Numerology b | O |

TABLE 23-continued

| LCH (1/2/3/4) | TTI type (A/B) | Numerology type (a/b) | Corresponding relation (transmission possible/impossible) |
|---|---|---|---|
| | TTI B | Numerology a | X |
| | | Numerology b | X |
| LCH 3 | TTI A | Numerology a | X |
| | | Numerology b | X |
| | TTI B | Numerology a | ○ |
| | | Numerology b | ○ |
| LCH 4 | TTI A | Numerology a | X |
| | | Numerology b | X |
| | TTI B | Numerology a | X |
| | | Numerology b | ○ |

2. In operation S701, the base station provides the UE with a corresponding relation between an SR configuration and an LCH.

A. As described above, an example of the corresponding relation may be defined as in Table 24. The corresponding relation may be transmitted through SchedulingRequest-Config or LogicalChannelConfig of an RRC IE.

TABLE 24

| SR configuration (X/Y/Z) | LCH (1/2/3/4/5/6/7/8) |
|---|---|
| SR configuration X | LCH 1, LCH 2 |
| SR configuration Y | LCH 3, LCH 4 |
| SR configuration Z | LCH 5, LCH 6, LCH 7, LCH 8 |

3. Furthermore, when data occurs in an LCH having a maximum value of a transmittable TTI length smaller than a given value, in operation S705, the base station provides the UE a bound value of a maximum TTI length in which such an operation is permitted in order for the UE to initiate a regular BSR regardless of priority between LCHs. For convenience sake, such a value is called a TTImax,bound.

A. An example of the value may be defined as in Table 25. The value may be transmitted through an RRC IE.

TABLE 25

| TTImax,bound | [X] ms |
|---|---|

4. In operations S707, S709, S711, and S713, when data occurs in a given LCH, the UE identifies a maximum value of a TTI length in which the data of the given LCH can be transmitted/received, and identifies whether the value is smaller than a TTImax,bound value.

In operations S715 and S717, the UE checks presence of data of another LCH.

A. If the maximum value of the TTI length that may be used by the LCH in which data has occurred is greater than the TTImax,bound value, in operation S719, the UE compares the priority of the LCH in which data has occurred with the priority of an LCH whose data is present in the buffer of the UE.

i. In operation S721, if the priority of the LCH in which data has occurred is higher than the priority of the LCH whose data is now present in the buffer of the UE, in operation S723, the UE initiates a regular BSR. In operation S725, the UE initiates an SR transmission procedure through an SR configuration corresponding to the LCH in which data has occurred.

ii. If the priority of the LCH in which data has occurred is equal to or lower than the priority of the LCH whose data is now present in the buffer of the UE, the UE does not initiate a regular BSR.

iii. If data is now not present in the buffer of the UE, the UE initiates a regular BSR. The initiated regular BSR initiates an SR transmission procedure through an SR configuration corresponding to the LCH in which data has occurred.

B. If the maximum value of the TTI length that may be used by the LCH in which data has occurred is smaller than the TTImax,bound value, the UE initiates a regular BSR regardless of priority between LCHs. The initiated regular BSR initiates an SR transmission procedure through an SR configuration corresponding to the LCH in which data has occurred.

The operation of the proposed scheme 8 according to the eighth embodiment has been described above.

sr-ProhibitTimer used in an SR procedure according to another embodiment of the disclosure is described below. In general, in LTE in which one UE has one SR configuration, an operation of sr-ProhibitTimer is as follows.

As long as one SR is pending, the MAC entity shall for each TTI:
    if no UL-SCH resources are available for a transmission in this TTI:
    if the MAC entity has no valid PUCCH resource for SR configured in any TTI: initiate a Random Access procedure (see subclause 5.1) on the SpCell and cancel all pending SRs;
    else if the MAC entity has at least one valid PUCCH resource for SR configured for this TTI and if this TTI is not part of a measurement gap or Sidelink Discovery Gap for Transmission and if sr-ProhibitTimer is not running:
    if SR_COUNTER<dsr-TransMax:
    increment SR_COUNTER by 1;
    instruct the physical layer to signal the SR on one valid PUCCH resource for SR;
    start the sr-ProhibitTimer.
    else:
    notify RRC to release PUCCH for all serving cells;
    notify RRC to release SRS for all serving cells;
    clear any configured downlink assignments and uplink grants;
    initiate a Random Access procedure (see subclause 5.1) on the SpCell and cancel all pending SRs.

That is, when the sr-ProhibitTimer operates, the UE cannot request SR signal transmission from the physical layer. Furthermore, when the UE requests SR signal transmission from the physical layer, the sr-ProhibitTimer operates. Accordingly, the sr-ProhibitTimer functions to control the time interval between contiguous SR signal transmissions so that it becomes a minimum sr-ProhibitTimer or more.

In the disclosure, in order to support UL communication through a plurality of TTIs/numerologies/resource indices, an example in which a base station provides a UE with a plurality of SR configurations has been considered. In such an example, the sr-ProhibitTimer may be configured as follows.

Each of SR configurations configured in a UE operates an independent sr-ProhibitTimer.

If a plurality of SR configurations is provided to a UE, one sr-ProhibitTimer operates for each UE.

First, an operation of a UE when each of SR configurations configured in the UE operates an independent sr-ProhibitTimer is described. For example, it is considered that the UE has two SR configurations, that is, an SR configuration X and an SR configuration Y, and the SR configurations operate sr-ProhibitTimer-X and sr-ProhibitTimer-Y, respectively. In this case, the UE operates as follows.

(1) A regular BSR start condition has been satisfied because data has occurred in an LCH (or TTI/numerology/resource index) corresponding to the SR configuration X, and thus SR transmission through the SR configuration X has been initiated.

(2) The UE checks whether the sr-ProhibitTimer-X operates.

A. If the sr-ProhibitTimer-X operates, the UE cannot request SR signal transmission from the physical layer.

B. If the sr-ProhibitTimer-X does not operate, the UE identifies an SR_COUNTER condition, and may request SR signal transmission from the physical layer if the SR_COUNTER condition is satisfied.

i. In this case, the UE drives the sr-ProhibitTimer-X.

(3) A regular BSR start condition has been satisfied because data was generated in an LCH (or TTI/numerology/resource index) corresponding to the SR configuration Y, and thus SR transmission through the SR configuration Y has been initiated.

(4) The UE checks whether the sr-ProhibitTimer-Y operates.

A. If the sr-ProhibitTimer-Y operates, the UE cannot request SR signal transmission from the physical layer.

B. If the sr-ProhibitTimer-Y does not operate, the UE identifies an SR_COUNTER condition, and may request SR signal transmission from the physical layer if the SR_COUNTER condition is satisfied.

i. In this case, the UE drives the sr-ProhibitTimer-Y.

As described above, if each of the SR configurations configured in the UE operates an independent sr-ProhibitTimer, the sr-ProhibitTimer-X affects only an SR procedure in the SR configuration X, and the sr-ProhibitTimer-Y affects only an SR procedure in the SR configuration Y. That is, the sr-ProhibitTimer-X does not affect an SR procedure in the SR configuration Y, and the sr-ProhibitTimer-Y does not affect an SR procedure in the SR configuration X.

Figure 10:
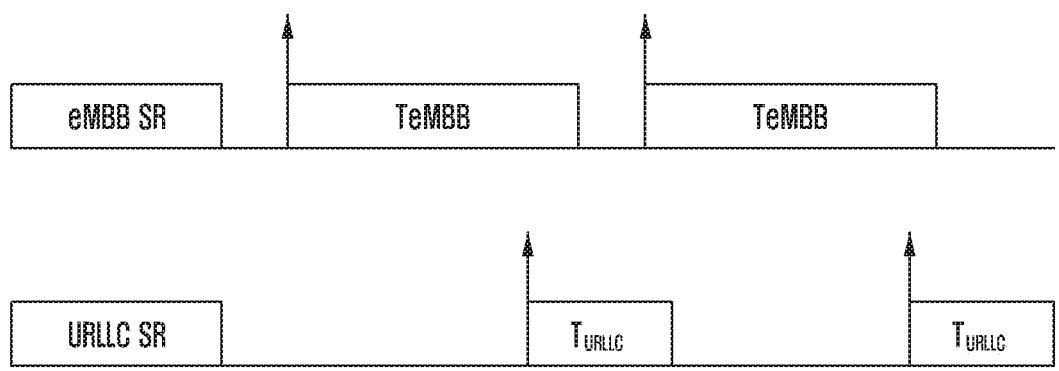
FIG. 10 is a diagram showing an example of an operation of sr-ProhibitTimer proposed in the disclosure (an independent operation of sr-ProhibitTimer for each SR configuration) according to an embodiment of the disclosure.

FIG. 10 is a diagram showing an example of an operation of sr-ProhibitTimer proposed in the disclosure (an independent operation of sr-ProhibitTimer for each SR configuration) according to an embodiment of the disclosure.

Referring to FIG. 10, an example of a UE operation when each of SR configurations configured in the UE operates an independent sr-ProhibitTimer is expressed in FIG. 10. It is considered that a base station has configured an SR configuration (eMBB SR) for an eMBB service or a LCH corresponding to the eMBB service in a UE and also has configured an SR configuration (URLLC SR) for an URLLC service or a LCH corresponding to the URLLC service in the UE. In this case, it is assumed that the sr-ProhibitTimer of the eMBB SR is TeMBB and the sr-ProhibitTimer of the URLLC SR is TURLLC. When the eMBB SR and the URLLC SR operate independent sr-ProhibitTimers, the UE may transmit an SR as in FIG. 10. That is, the URLLC SR may be transmitted during a TeMBB operation, and the eMBB SR may be transmitted during a TURLLC operation. An arrow in FIG. 10 means that the MAC layer has instructed the PHY layer to transmit an SR.

An operation of a UE when each UE operates one sr-ProhibitTimer although the UE has a plurality of SR configurations is described below. For example, it is considered that a UE has two SR configurations, that is, an SR configuration X and an SR configuration Y, and operates one sr-ProhibitTimer. In this case, the UE operates as follows.

(1) A regular BSR start condition has been satisfied because data has occurred in an LCH (or TTI/numerology/resource index) corresponding to the SR configuration X, and thus SR transmission through the SR configuration X has been initiated.

(2) The UE checks whether the sr-ProhibitTimer operates.

A. If the sr-ProhibitTimer operates, the UE cannot request SR signal transmission from the physical layer.

B. If the sr-ProhibitTimer does not operate, the UE identifies an SR_COUNTER condition, and may request SR signal transmission from the physical layer if the SR_COUNTER condition is satisfied.

i. In this case, the UE drives the sr-ProhibitTimer.

(3) A regular BSR start condition has been satisfied because an LCH (or TTI/numerology/resource index) corresponding to the SR configuration Y has occurred, and thus SR transmission through the SR configuration Y has been initiated.

(4) The UE checks whether the sr-ProhibitTimer operates.

A. If the sr-ProhibitTimer operates, the UE cannot request SR signal transmission from the physical layer.

B. If the sr-ProhibitTimer does not operate, the UE identifies an SR_COUNTER condition, and may request SR signal transmission from the physical layer if the SR_COUNTER condition is satisfied.

i. In this case, the UE drives the sr-ProhibitTimer.

As described above, although a UE has a plurality of SR configurations, when one sr-ProhibitTimer operates for each UE, the sr-ProhibitTimer affects both an SR procedure in the SR configuration X and an SR procedure in the SR configuration Y. That is, the time interval between contiguous SR signal transmissions becomes a minimum sr-ProhibitTimer or more regardless of an SR procedure in which SR configuration.

Figure 11:
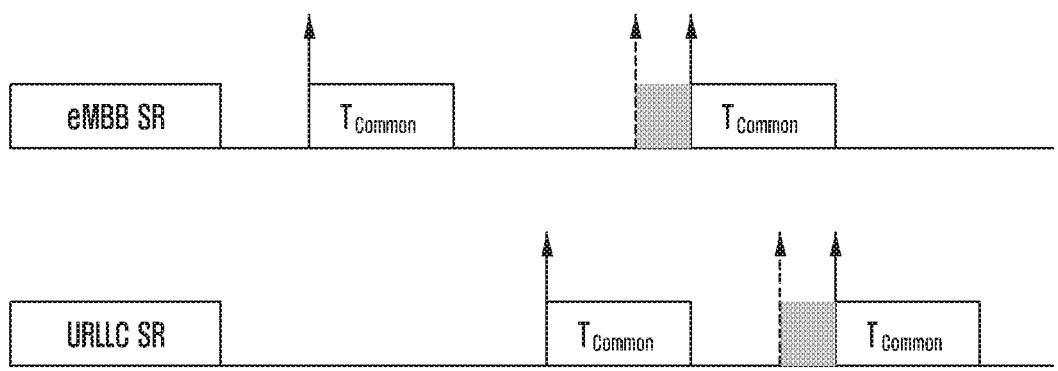
FIG. 11 is a diagram showing an example of an operation of sr-ProhibitTimer proposed in the disclosure (an SR configuration uses a shared timer length) according to an embodiment of the disclosure.

FIG. 11 is a diagram showing an example of an operation of sr-ProhibitTimer proposed in the disclosure (an SR configuration uses a shared timer length) according to an embodiment of the disclosure.

Referring to FIG. 11, a UE operation when one sr-ProhibitTimer operates for each UE although the UE has a plurality of SR configurations is expressed in FIG. 11. It is considered that a base station has configured an SR configuration (eMBB SR) for an eMBB service or a LCH corresponding to the eMBB service in a UE and also has configured an SR configuration (URLLC SR) for an URLLC service or a LCH corresponding to the URLLC service in the UE. In this case, it is assumed that the sr-ProhibitTimer of the eMBB SR and the sr-ProhibitTimer of the URLLC SR are the same, that is, TCommon. In this case, the eMBB SR and the URLLC SR may transmit an SR using the common sr-ProhibitTimer as in FIG. 11. That is, the eMBB SR and the URLLC SR cannot be transmitted during a TCommon operation, and the eMBB SR or URLLC SR may be transmitted only when TCommon does not operate. In FIG. 11, a solid arrow means that the MAC layer has instructed the PHY layer to transmit an SR, and a dashed arrow means that an SR procedure for determining whether to transmit an SR has been initiated.

Furthermore, it is considered that each of SR configurations configured in the UE has an independent sr-ProhibitTimer, but whether to perform SR transmission based on a given SR configuration is influenced by the sr-ProhibitTimer of another SR configuration. For example, it is considered that the UE has two SR configurations, that is, an SR configuration X and an SR configuration Y and the sr- ProhibitTimer-X and the sr-ProhibitTimer-Y have been configured in the respective SR configurations. In this case, the UE operates as follows.

(1) A regular BSR start condition has been satisfied because data has occurred in an LCH corresponding to the SR configuration X (or TTI/numerology/resource index), and thus SR transmission through the SR configuration X has been initiated.

(2) The UE checks whether the sr-ProhibitTimer-X and the sr-ProhibitTimer-Y operate.

A. If the sr-ProhibitTimer-X operates, the UE cannot request SR signal transmission from the physical layer. Furthermore, if the sr-ProhibitTimer-Y operates, the UE cannot request SR signal transmission from the physical layer.

B. If both the sr-ProhibitTimer-X and the sr-ProhibitTimer-Y operate, the UE checks an SR_COUNTER condition, and may request SR signal transmission from the physical layer if the SR_COUNTER condition is satisfied.

i. In this case, the UE drives the sr-ProhibitTimer-X.

(3) A regular BSR start condition has been satisfied because data has occurred in an LCH (or TTI/numerology/resource index) corresponding to the SR configuration Y, and thus SR transmission through the SR configuration Y has been initiated.

(4) The UE checks whether the sr-ProhibitTimer-Y and the sr-ProhibitTimer-X operate.

A. If the sr-ProhibitTimer-Y operates, the UE cannot request SR signal transmission from the physical layer. Furthermore, if the sr-ProhibitTimer-X operates, the UE cannot request SR signal transmission from the physical layer.

B. If both the sr-ProhibitTimer-Y and the sr-ProhibitTimer-X do not operate, the UE checks the SR_COUNTER condition, and may request SR signal transmission from the physical layer if the SR_COUNTER condition is satisfied.

i. In this case, the UE drives the sr-ProhibitTimer-Y.

As described above, in such an operation, although different sr-ProhibitTimer-X and sr-ProhibitTimer-Y have been configured in the SR configuration X and SR configuration Y configured in the UE, but whether to perform SR transmission based on each SR configuration is determined by both the sr-ProhibitTimer-X and the sr-ProhibitTimer-Y.

Figure 12:
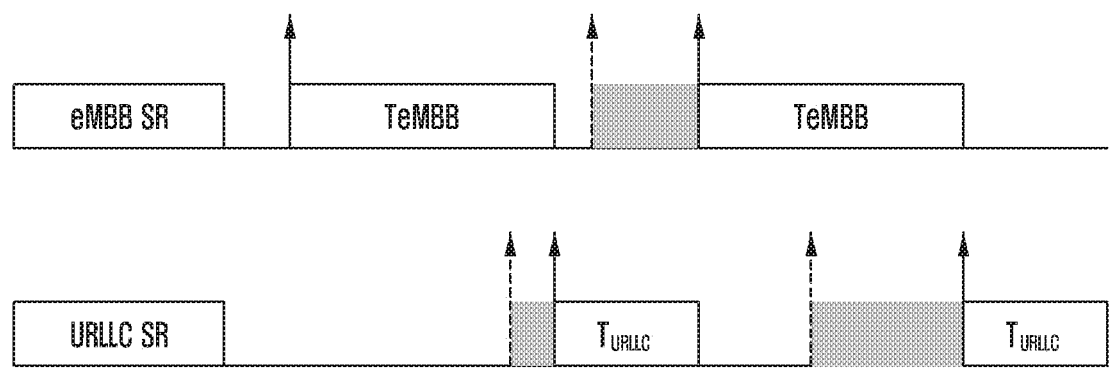
FIG. 12 is a diagram showing an example of an operation of sr-ProhibitTimer proposed in the disclosure (if sr-ProhibitTimer operates for each SR configuration, SR transmission is not permitted when the timer of another SR configuration operates) according to an embodiment of the disclosure.

FIG. 12 is a diagram showing an example of an operation of sr-ProhibitTimer proposed in the disclosure (if sr-ProhibitTimer operates for each SR configuration, SR transmission is not permitted when the timer of another SR configuration operates) according to an embodiment of the disclosure.

An example of such an operation is expressed in FIG. 12. It is considered that a base station has configured an SR configuration (eMBB SR) for an eMBB service or a LCH corresponding to the eMBB service in a UE and also has configured an SR configuration (URLLC SR) for an URLLC service or a LCH corresponding to the URLLC service in the UE. In this case, it is assumed that the sr-ProhibitTimer of the eMBB SR is TeMBB and the sr-ProhibitTimer of the URLLC SR is TURLLC. In this case, although an independent sr-ProhibitTimer has been configured in each of the eMBB SR and URLLC SR, when whether to perform SR transmission is determined by both the TeMBB and TURLLC, the UE may transmit an SR as in FIG. 12. That is, the UE cannot transmit the URLLC SR in addition to the eMBB SR during a TeMBB operation, and cannot transmit the eMBB SR in addition to the URLLC SR during a TURLLC operation. Furthermore, when both the TeMBB and the TURLLC do not operate, the UE may transmit the SR. In FIG. 12, a solid arrow means that the MAC layer has instructed the PHY layer the SR, and a dashed arrow means that an SR procedure for determining whether to perform SR transmission has been initiated.

Furthermore, it is considered that each of SR configurations configured in the UE has an independent sr-ProhibitTimer, whether to perform SR transmission based on a given SR configuration is influenced by the sr-ProhibitTimer of another SR configuration, and whether to perform SR transmission based on a given SR configuration is not influenced by the sr-ProhibitTimer of yet another SR configuration. For example, it is considered that the UE has two SR configurations, that is, an SR configuration X and an SR configuration Y and an sr-ProhibitTimer-X and an sr-ProhibitTimer-Y have been configured in the respective SR configurations. In this case, the UE operates as follows.

(1) A regular BSR start condition has been satisfied because data has occurred in an LCH (or TTI/numerology/resource index) corresponding to the SR configuration X, and thus SR transmission through the SR configuration X has been initiated.

(2) The UE checks whether sr-ProhibitTimer-X and sr-ProhibitTimer-Y operate.

A. If the sr-ProhibitTimer-X operates, the UE cannot request SR signal transmission from the physical layer. Furthermore, if the sr-ProhibitTimer-Y operates, the UE cannot request SR signal transmission from the physical layer.

B. If both the sr-ProhibitTimer-X and the sr-ProhibitTimer-Y do not operate, the UE checks an SR_COUNTER condition, and may request SR signal transmission from the physical layer if the SR_COUNTER condition is satisfied.

i. In this case, the UE drives the sr-ProhibitTimer-X.

(3) A regular BSR start condition has been satisfied because data has occurred in an LCH (or TTI/numerology/resource index) corresponding to the SR configuration Y, and thus SR transmission through the SR configuration Y has been initiated.

(4) The UE checks whether the sr-ProhibitTimer-Y operates.

A. If the sr-ProhibitTimer-Y operates, the UE cannot request SR signal transmission from the physical layer.

B. If the sr-ProhibitTimer-Y does not operate, the UE checks the SR_COUNTER condition, and may request SR signal transmission from the physical layer if the SR_COUNTER condition is satisfied.

i. In this case, the UE drives the sr-ProhibitTimer-Y.

Figure 13:
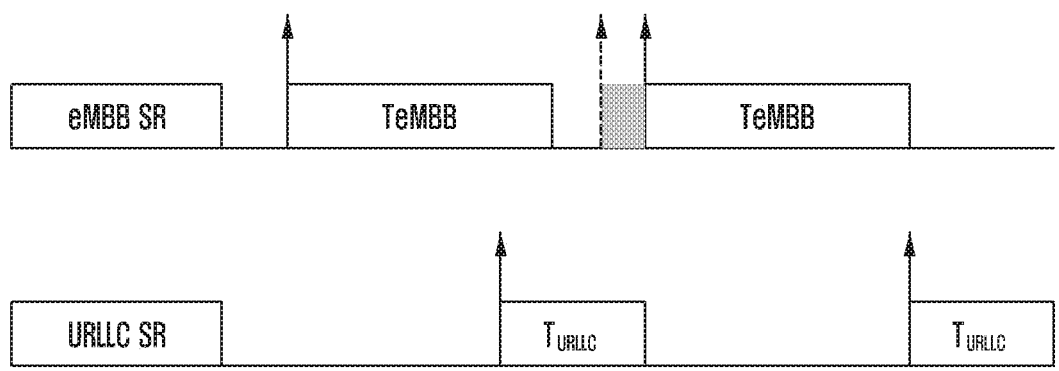
FIG. 13 is a diagram showing an example of an operation of sr-ProhibitTimer proposed in the disclosure (determine whether it is possible to neglect sr-ProhibitTimer based on priority of a logical channel) according to an embodiment of the disclosure.

FIG. 13 is a diagram showing an example of an operation of sr-ProhibitTimer proposed in the disclosure (determine whether it is possible to neglect sr-ProhibitTimer based on priority of a LCH) according to an embodiment of the disclosure.

An example of such an operation is expressed in FIG. 13. It is considered that a base station has configured an SR configuration (eMBB SR) for an eMBB service or a LCH corresponding to the eMBB service in a UE and also has configured an SR configuration (URLLC SR) for an URLLC service or a LCH corresponding to the URLLC service in the UE. In this case, it is assumed that the sr-ProhibitTimer of the eMBB SR is TeMBB and the sr-ProhibitTimer of the URLLC SR is TURLLC. In this case, although an independent sr-ProhibitTimer has been configured in each of the eMBB SR and the URLLC SR, when whether to perform eMBB SR transmission is determined by both the TeMBB and the TURLLC and whether to perform URLLC SR transmission is determined by the TURLLC, the UE may transmit the SR as in FIG. 13.

That is, the UE cannot transmit the eMBB SR, but can transmit the URLLC SR during a TeMBB operation. Furthermore, the UE cannot transmit the eMBB SR in addition to the URLLC SR during a TURLLC operation. That is, the eMBB SR may be transmitted when both the TeMBB and TURLLC do not operate, and the URLLC SR may be transmitted when only the TURLLC does not operate. In FIG. 13, a solid arrow means that the MAC layer has instructed the PHY layer to transmit an SR, and a dashed arrow means that an SR procedure for determining whether to perform SR transmission has been initiated.

In this case, there is a need for a method for an SR configuration to determine whether to transmit information about SR transmission by considering which sr-Prohibit-Timer. To this end, the disclosure proposes the following method.

- A given SR configuration determines whether to perform SR transmission by considering the sr-ProhibitTimer of an SR configuration having a shorter length or time than the sr-ProhibitTimer of the given SR configuration. It is considered that SR configurations 1, 2 and 3 are present and have sr-ProhibitTimer of T1=100 ms, T2=200 ms, and T3=300 ms, respectively. In this case, if T1 does not operate, the SR configuration 1 may instruct the PHY SR transmission. Furthermore, when both T1 and T2 do not operate, the SR configuration 2 may instruct the PHY SR transmission. Furthermore, when all of T1, T2 and T3 do not operate, the SR configuration may instruct the PHY SR transmission.
- A given SR configuration checks the highest priority of the priorities of LCH mapped thereto, and determines whether to perform SR transmission by considering that the sr-ProhibitTimer of which SR configuration operates. It is considered that SR configurations 1, 2 and 3 are present and LCH mapped to the respective SR configurations have the highest priorities of P1=1, P2=3, and P3=5, respectively. In this case, a lower number correspond to higher priority. In this case, if T1 does not operate, the SR configuration 1 may instruct the PHY SR transmission. Furthermore, when both T1 and T2 do not operate, the SR configuration 2 may instruct the PHY SR transmission. Furthermore, when all of T1, T2 and T3 do not operate, the SR configuration may instruct the PHY SR transmission. In this case, Tj refers to the sr-ProhibitTimer of an SR configuration j. That is, an SR configuration corresponding to an LCH having low priority determines whether to perform SR transmission by considering whether the sr-ProhibitTimer of an SR configuration corresponding to an LCH having higher priority than that of the SR configuration itself operates.

SR_COUNTER and dsr-TransMax used in an SR procedure are described below. In general, in LTE in which one UE has one SR configuration, SR_COUNTER and dsr-TransMax operate as follows.

As long as one SR is pending, the MAC entity shall for each TTI:
  if no UL-SCH resources are available for a transmission in this TTI:
    if the MAC entity has no valid PUCCH resource for SR configured in any TTI: initiate a Random Access procedure (see subclause 5.1) on the SpCell and cancel all pending SRs;
    else if the MAC entity has at least one valid PUCCH resource for SR configured for this TTI and if this TTI is not part of a measurement gap or Sidelink Discovery Gap for Transmission and if sr-ProhibitTimer is not running:
      if SR_COUNTER<dsr-TransMax:
      increment SR_COUNTER by 1;
      instruct the physical layer to signal the SR on one valid PUCCH resource for SR;
      start the sr-ProhibitTimer.
      else:
      notify RRC to release PUCCH for all serving cells;
      notify RRC to release SRS for all serving cells;
      clear any configured downlink assignments and uplink grants;
      initiate a Random Access procedure (see subclause 5.1) on the SpCell and cancel all pending SRs.

That is, whenever a UE requests SR signal transmission from the physical layer, SR_COUNTER is increased by 1. Furthermore, the UE may request SR signal transmission from the physical layer only when SR_COUNTER is smaller than dsr-TransMax. Furthermore, if SR_COUNTER is equal to dsr-TransMax, the UE releases a PUCCH, an SRS, DL assignment, and an UL grant at the same time, starts a random access procedure. Accordingly, this means that the role of SR_COUNTER and dsr-TransMax are no longer valid after an SR configuration allocated to the UE by a base station performs SR transmission dsr-TransMax.

In the disclosure, the situation in which a base station provides a UE with a plurality of SR configurations in order to support UL communication through a plurality of TTIs/ numerologies/resource indices has been considered. In such a situation, SR_COUNTER and dsr-TransMax may be configured as follows.

- Each of SR configurations configured in a UE operate independent SR_COUNTER and dsr-TransMax.
- Although a plurality of SR configurations is provided to a UE, SR_COUNTER and dsr-TransMax are operated for each UE.

First, an operation of a UE when each of SR configurations configured in the UE operates independent SR_COUNTER and dsr-TransMax is described below. For example, it is considered that a UE has two SR configurations, that is, an SR configuration X and an SR configuration Y, and the two SR configurations operate SR_COUNTER_X and dsr-TransMax-X, and SR_COUNTER_Y and dsr-Trans-Max-Y, respectively. In this case, the UE operates as follows.

(1) A regular BSR start condition has been satisfied because data has occurred in an LCH (or TTI/numerology/ resource index) corresponding to the SR configuration X, and thus SR transmission through the SR configuration X has been initiated. In this case, it is assumed that sr-ProhibitTimer (for each UE or SR configuration) does not operate.

A. If SR_COUNTER_X is smaller than dsr-TransMax-X, the UE requests SR signal transmission from the physical layer.
    i. In this case, the UE increases SR_COUNTER_X by 1 and drives sr-ProhibitTimer.
  B. If SR_COUNTER_X is equal to dsr_TransMax-X, the UE cannot request SR signal transmission from the physical layer.
    i. In this case, the UE releases a PUCCH, an SRS, DL assignment, and an UL grant and at the same time, starts a random access procedure.

(2) A regular BSR start condition has been satisfied because data has occurred in an LCH (or TTI/numerology/ resource index) corresponding to the SR configuration Y, and thus SR transmission through the SR configuration Y has been initiated. In this case, it is assumed that sr-ProhibitTimer (for each UE or SR configuration) does not operate.

A. If SR_COUNTER_Y is smaller than dsr-TransMax-Y, the UE requests SR signal transmission from the physical layer.

i. In this case, the UE increases SR_COUNTER_Y by 1 and drives sr-ProhibitTimer.

B. If SR_COUNTER_Y is equal to dsr_TransMax-Y, the UE cannot request SR signal transmission from the physical layer.

i. In this case, the UE releases a PUCCH, an SRS, DL assignment, and an UL grant and at the same time, starts a random access procedure.

As described above, if each of the SR configurations configured in the UE operates independent SR_COUNTER and dsr-TransMax, SR_COUNTER_X is increased by only SR signal transmission in the SR configuration X and SR_COUNTER_Y is increased by only SR signal transmission in the SR configuration Y. That is, the SR signal transmission in the SR configuration Y does not increase SR_COUNTER_X, and the SR signal transmission in the SR configuration X does not increase SR_COUNTER_Y. Furthermore, if any one of the number of SR signal transmissions in the SR configuration X and the number of SR signal transmissions in the SR configuration Y reaches dsr-TransMax-X or dsr-Trans-Max-Y, the UE releases a PUCCH, an SRS, DL assignment, and an UL grant and at the same time, starts a random access procedure.

Figure 14:
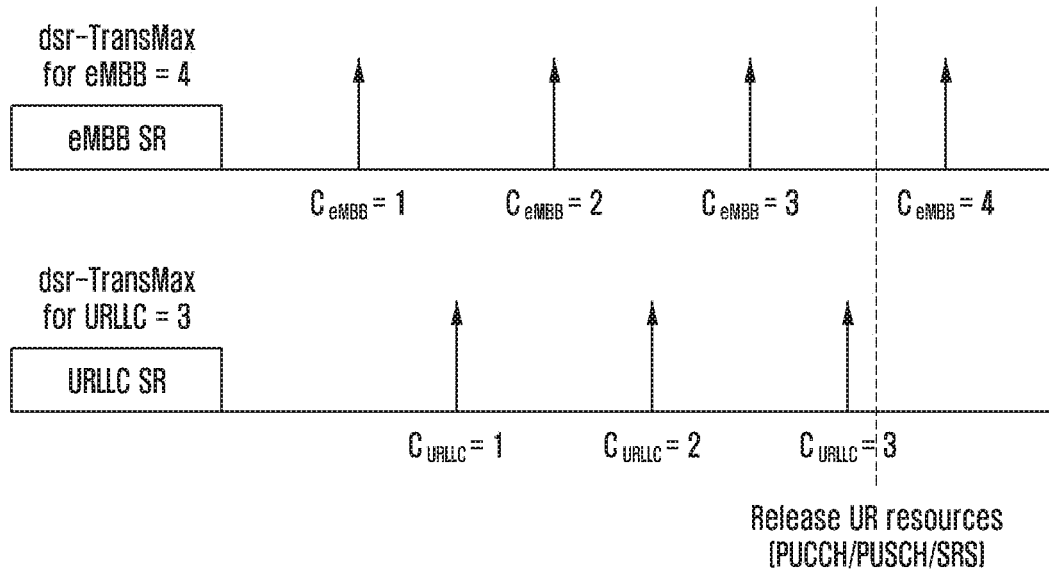
FIG. 14 is a diagram showing an example of an operation of dsr-TransMax and SR_COUNTER proposed in the disclosure (SR_COUNTER individual counting for each SR configuration) according to an embodiment of the disclosure.

FIG. 14 is a diagram showing an example of an operation of dsr-TransMax and SR_COUNTER proposed in the disclosure (SR_COUNTER individual counting for each SR configuration) according to an embodiment of the disclosure.

An example of such an operation is expressed in FIG. 14. It is considered that a base station has configured an SR configuration (eMBB SR) for an eMBB service or a LCH corresponding to the eMBB service in a UE and also has configured an SR configuration (URLLC SR) for an URLLC service or a LCH corresponding to the URLLC service in the UE. In this case, it is assumed that SR_COUNTER of the eMBB SR is CeMBB and SR_COUNTER of the URLLC SR is CURLLC. Furthermore, it is considered that dsr-TransMax configured to eMBB_SR is 4 and dsr-TransMax configured for URLLC_SR is 3. In this case, when an SR is transmitted based on eMBB_SR, CeMBB is increased by and CURLLC does not increase. Furthermore, when an SR is transmitted based on URLLC_SR, CURLLC is increased by 1 and CeMBB does not increase. Furthermore, when CeMBB reaches 4 that is dsr-TransMax of eMBB_SR or CURLLC reaches 3 that is dsr-TransMax of URLLC_SR, the UE releases a PUCCH, an SRS, DL assignment, and an UL grant and at the same time, starts a random access procedure.

An operation of a UE is described below when SR_COUNTER and dsr-TransMax are operated for each UE although the UE has a plurality of SR configurations. For example, it is considered that the UE has two SR configurations, that is, an SR configuration X and an SR configuration Y, and operates one SR_COUNTER and one dsr-TransMax. In this case, the UE operates as follows.

(1) A regular BSR start condition has been satisfied because data has occurred in an LCH (or TTI/numerology/resource index) corresponding to the SR configuration X, and thus SR transmission through the SR configuration X has been initiated. In this case, it is assumed that sr-ProhibitTimer (for each UE or SR configuration) does not operate.

A. If SR_COUNTER is smaller than dsr-TransMax, the UE requests SR signal transmission from the physical layer.

i. In this case, the UE increases SR_COUNTER by 1 and drives sr-ProhibitTimer.

B. If SR_COUNTER is equal to dsr_TransMax, the UE cannot request SR signal transmission from the physical layer.

i. In this case, the UE releases a PUCCH, an SRS, DL assignment, and an UL grant and at the same time, starts a random access procedure.

(2) A regular BSR start condition has been satisfied because data has occurred in an LCH (or TTI/numerology/resource index) corresponding to the SR configuration Y, and thus SR transmission through the SR configuration Y has been initiated. In this case, it is assumed that sr-ProhibitTimer (for each UE or SR configuration) does not operate.

A. If SR_COUNTER is smaller than dsr-TransMax, the UE requests SR signal transmission from the physical layer.

i. In this case, the UE increases SR_COUNTER by 1 and drives sr-ProhibitTimer.

B. If SR_COUNTER is equal to dsr_TransMax, the UE cannot request SR signal transmission from the physical layer.

i. In this case, the UE releases a PUCCH, an SRS, DL assignment, and an UL grant and at the same time, starts a random access procedure.

As described above, although the UE has a plurality of SR configurations, if SR_COUNTER and dsr-TransMax are operated for each UE, SR_COUNTER is increased by both SR transmission in the SR configuration X and SR transmission in the SR configuration Y. Furthermore, when the sum of SR transmission in the SR configuration X and SR transmission in the SR configuration Y reaches dsr-TransMax, the UE releases a PUCCH, an SRS, DL assignment, and an UL grant and at the same time, starts a random access procedure.

Figure 15:
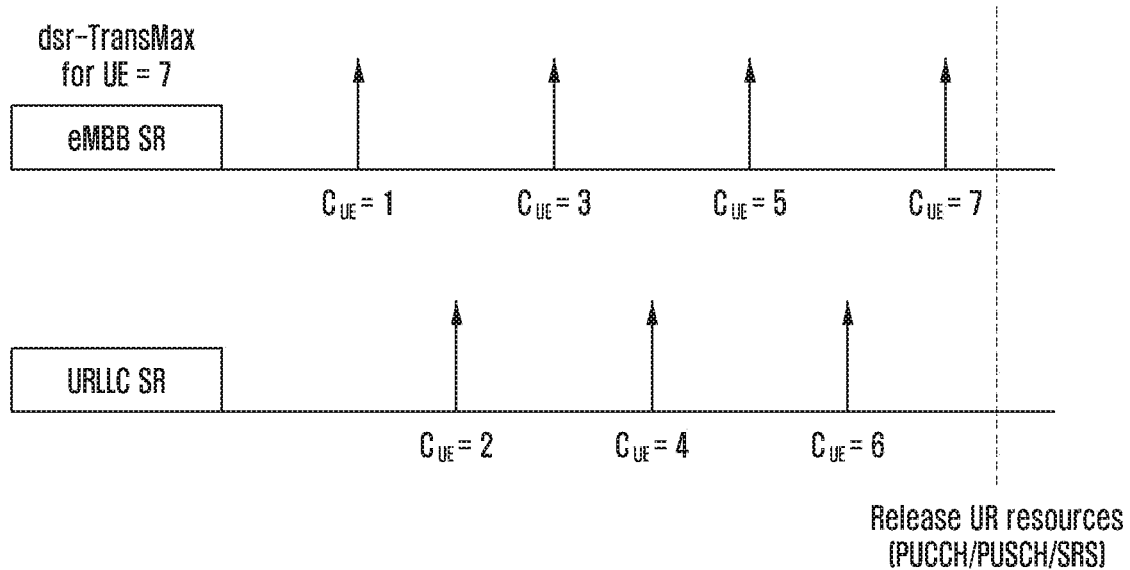
FIG. 15 is a diagram showing an example of an operation of dsr-TransMax and SR_COUNTER proposed in the disclosure (SR_COUNTER common counting for each SR configuration) according to an embodiment of the disclosure.

FIG. 15 is a diagram showing an example of an operation of dsr-TransMax and SR_COUNTER proposed in the disclosure (SR_COUNTER common counting for each SR configuration) according to an embodiment of the disclosure.

An example of such an operation is expressed in FIG. 15. It is considered that a base station has configured an SR configuration (eMBB_SR) for an eMBB service or a LCH corresponding to the eMBB service in a UE and also has configured an SR configuration (URLLC_SR) for an URLLC service or a LCH corresponding to the URLLC service in the UE. In this case, it is assumed that SR_COUNTER of the UE applied to both the eMBB_SR and the URLLC_SR is CUE. Furthermore, it is considered that dsr-TransMax configured for the UE is 7. In this case, when an SR is transmitted based on eMBB_SR, CUE is increased by 1. When an SR is transmitted based on URLLC_SR, CUE is increased by 1. Furthermore, when CUE reaches 7 that is dsr-TransMax of the UE, the UE releases a PUCCH, an SRS, DL assignment, and an UL grant and at the same time, starts a random access procedure.

In the disclosure, the situation in which a base station provides a UE with a plurality of SR configurations in order to support UL communication through a plurality of TTIs/numerologies/resource indices has been considered. If SR resources having different SR configurations have been redundantly allocated to the same time or the same frequency resource, a UE has to select an SR signal corresponding to one SR configuration and transmit the SR signal. In this case, the UE may select one SR configuration based on the following criterion.

The UE identifies the LCHs of data whose regular BSR has been initiated, and compares the priorities of LCHs. Furthermore, the UE selects an LCH having the highest priority and selects an SR configuration corresponding to the LCH having the highest priority. Thereafter, the UE selects an SR signal corresponding to the selected SR configuration and transmits the selected SR signal.

Figure 8:
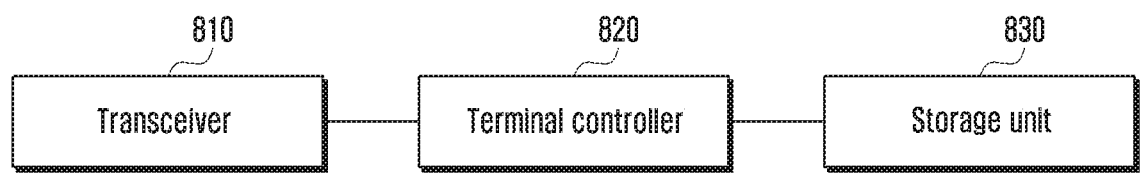
FIG. 8 is a diagram showing the configuration of a user equipment (UE) according to an embodiment of the disclosure.

FIG. 8 is a diagram showing the configuration of a UE according to an embodiment of the disclosure.

Referring to FIG. 8, the UE may include a transceiver 810, a UE controller 820, and a storage unit 830. In the disclosure, the UE controller 820 may be defined as a circuit or an ASIC or at least one processor.

The transceiver 810 may transmit/receive a signal to/from another network entity. The transceiver 810 may receive system information from a base station, for example, and may receive a synchronization signal or a reference signal.

The UE controller 820 may control an overall operation of the UE according to the embodiments proposed in the disclosure. For example, the UE controller 820 may control a signal flow between the blocks so that the operations according to the drawings and flowcharts are performed.

The storage unit 830 may store at least one of information transmitted/received through the transceiver and information generated through the UE controller.

Figure 9:
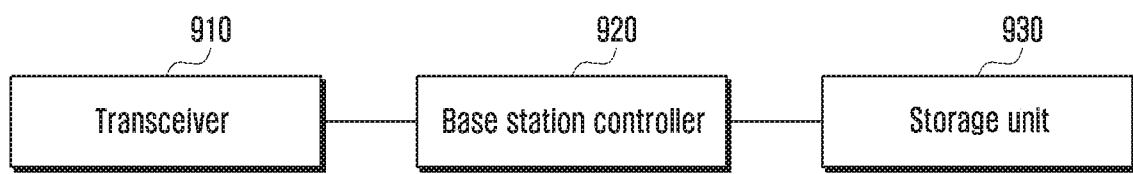
FIG. 9 is a diagram showing the configuration of a base station according to an embodiment of the disclosure.

FIG. 9 is a diagram showing the configuration of a base station according to an embodiment of the disclosure.

Referring to FIG. 9, the base station may include a transceiver 910, a base station controller 920, and a storage unit 930. In the disclosure, the base station controller 920 may be defined as a circuit or an ASIC or at least one processor.

The transceiver 910 may transmit/receive a signal to/from another network entity. The transceiver 910 may transmit system information to a UE, for example, and may transmit a synchronization signal or a reference signal.

The base station controller 920 may control an overall operation of the base station according to the embodiments proposed in the disclosure.

The storage unit 930 may store at least one of information transmitted/received through the transceiver and information generated through the controller.

In accordance with the embodiments of the disclosure, although data occurs in a service or LCH having low priority, a situation in which an SR transmission operation is not initiated due to a service or LCH having high priority can be avoided based on the configuration of a base station. Accordingly, when an SR signal is received from a UE, a base station can immediately identify the type of service occurred in the UE, and may allocate an UL resource having a numerology or TTI length suitable for the UE to perform transmission. Accordingly, the UE and the base station can use a plurality of services more efficiently in terms of UL transmission/reception.

The embodiments of the disclosure disclosed in the specification and drawings propose only given examples in order to easily describe the contents of the disclosure and help understanding of the disclosure, and are not intended to restrict the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
receiving, from a base station, a radio resource control (RRC) message including a plurality of logical channel (LCH) configurations for each of a plurality of LCHs and a plurality of scheduling request (SR) configurations, each of the plurality of LCH configurations including information on one or more numerologies to which uplink data from a corresponding LCH is mapped, wherein each of the plurality of SR configurations corresponds to one or more LCHs among the plurality of LCHs;
in case that uplink data has occurred in an LCH among the plurality of LCHs, identifying an SR configuration corresponding to the LCH among the plurality of SR configurations;
in case that an SR prohibit timer configured for the SR configuration is not running and a number of times of SR transmission counted for the SR configuration is lower than a maximum number of times of SR transmission configured for the SR configuration, transmitting, to the base station, an SR for requesting an uplink grant based on the SR configuration; and
starting the SR prohibit timer configured for the SR configuration,
wherein the SR is transmitted on a physical uplink control channel (PUCCH) associated with the SR configuration,
wherein an SR prohibit timer is configured for each of the plurality of SR configurations,
wherein a maximum number of times of SR transmission is configured for each of the plurality of SR configurations, and
wherein a number of times of SR transmission is counted for each of the plurality of SR configurations.

2. The method of claim 1, wherein the SR configuration includes information on the SR prohibit timer for the SR configuration and information on the maximum number of times of SR transmission for the SR configuration.

3. The method of claim 1, further comprising:
in case that the SR prohibit timer configured for the SR configuration is not running and the number of times of SR transmission counted for the SR configuration is equal to the maximum number of times of SR transmission configured for the SR configuration, releasing a physical uplink control channel (PUCCH), sounding reference signal (SRS), downlink assignments, and uplink grants.

4. The method of claim 1,
wherein, in case that the SR configuration is a first SR configuration, transmission of the SR is based on an SR prohibit timer configured for the first SR configuration, a number of times of SR transmission counted for the first SR configuration, and a maximum number of times of SR transmission configured for the first SR configuration, and
wherein, in case that the SR configuration is a second SR configuration, transmission of the SR is based on an SR prohibit timer configured for the second SR configuration, a number of times of SR transmission counted for the second SR configuration, and a maximum number of times of SR transmission configured for the second SR configuration.

5. The method of claim 1, wherein the uplink data occurred in the LCH is mapped to a numerology among the one or more numerologies.

6. A method performed by a base station in a communication system, the method comprising:
transmitting, to a terminal, a radio resource control (RRC) message including a plurality of logical channel (LCH) configurations for each of a plurality of LCHs and a plurality of scheduling request (SR) configurations, each of the plurality of LCH configurations including information on one or more numerologies to which uplink data from a corresponding LCH is mapped, wherein each of the plurality of SR configurations corresponds to one or more LCHs among the plurality of LCHs; and
in case that uplink data has occurred in an LCH among the plurality of LCHs, receiving, from the terminal, an SR for requesting an uplink grant based on an SR configuration corresponding to the LCH among the plurality of SR configurations,
wherein the SR is received from the terminal in case that an SR prohibit timer configured for the SR configuration is not running and a number of times of SR transmission counted for the SR configuration is lower than a maximum number of times of SR transmission configured for the SR configuration,
wherein an SR prohibit timer is configured for each of the plurality of SR configurations,
wherein a maximum number of times of SR transmission is configured for each of the plurality of SR configurations,
wherein a number of times of SR transmission is counted for each of the plurality of SR configurations,
wherein the SR configuration includes information on the SR prohibit timer for the SR configuration and information on the maximum number of times of SR transmission for the SR configuration, and
wherein the SR is received on a physical uplink control channel (PUCCH) associated with the SR configuration.

7. The method of claim 6,
wherein, in case that the SR configuration is a first SR configuration, reception of the SR is based on an SR prohibit timer configured for the first SR configuration, a number of times of SR transmission counted for the first SR configuration, and a maximum number of times of SR transmission configured for the first SR configuration, and
wherein, in case that the SR configuration is a second SR configuration, reception of the SR is based on an SR prohibit timer configured for the second SR configuration, a number of times of SR transmission counted for the second SR configuration, and a maximum number of times of SR transmission configured for the second SR configuration.

8. The method of claim 6, wherein the uplink data occurred in the LCH is mapped to a numerology among the one or more numerologies.

9. A terminal in a communication system, the terminal comprising:
a transceiver; and
a controller configured to:
receive, from a base station via the transceiver, a radio resource control (RRC) message including a plurality of logical channel (LCH) configurations for each of a plurality of LCHs and a plurality of scheduling request (SR) configurations, each of the plurality of LCH configurations including information on one or more numerologies to which uplink data from a corresponding LCH is mapped, wherein each of the plurality of SR configurations corresponds to one or more LCHs among the plurality of LCHs,
in case that uplink data has occurred in an LCH among the plurality of LCHs, identify an SR configuration corresponding to the LCH among the plurality of SR configurations,
in case that an SR prohibit timer configured for the SR configuration is not running and a number of times of SR transmission counted for the SR configuration is lower than a maximum number of times of SR transmission configured for the SR configuration, transmit, to the base station via the transceiver, an SR for requesting an uplink grant based on the SR configuration, and
start the SR prohibit timer configured for the SR configuration,
wherein the SR is transmitted on a physical uplink control channel (PUCCH) associated with the SR configuration,
wherein an SR prohibit timer is configured for each of the plurality of SR configurations,
wherein a maximum number of times of SR transmission is configured for each of the plurality of SR configurations, and
wherein a number of times of SR transmission is counted for each of the plurality of SR configurations.

10. The terminal of claim 9, wherein the SR configuration includes information on the SR prohibit timer for the SR configuration and information on the maximum number of times of SR transmission for the SR configuration.

11. The terminal of claim 9, wherein the controller is further configured to:
in case that the SR prohibit timer configured for the SR configuration is not running and the number of times of SR transmission counted for the SR configuration is equal to the maximum number of times of SR transmission configured for the SR configuration, release a physical uplink control channel (PUCCH), sounding reference signal (SRS), downlink assignments, and uplink grants.

12. The terminal of claim 9,
wherein, in case that the SR configuration is a first SR configuration, transmission of the SR is based on an SR prohibit timer configured for the first SR configuration, a number of times of SR transmission counted for the first SR configuration, and a maximum number of times of SR transmission configured for the first SR configuration, and
wherein, in case that the SR configuration is a second SR configuration, transmission of the SR is based on an SR prohibit timer configured for the second SR configuration, a number of times of SR transmission counted for the second SR configuration, and a maximum number of times of SR transmission configured for the second SR configuration.

13. The terminal of claim 9, wherein the uplink data occurred in the LCH is mapped to a numerology among the one or more numerologies.

14. A base station in a communication system, the base station comprising:
a transceiver; and
a controller configured to:
transmit, to a terminal via the transceiver, a radio resource control (RRC) message including a plurality of logical channel (LCH) configurations for each of a plurality of LCHs and a plurality of scheduling request (SR) configurations, each of the plurality of LCH configurations including information on one or more numerologies to which uplink data from a corresponding LCH is mapped, wherein each of the plurality of SR configurations corresponds to one or more LCHs among the plurality of LCHs, and in case that uplink data has occurred in an LCH among the plurality of LCHs, receive, from the terminal via the transceiver, an SR for requesting an uplink grant based on an SR configuration corresponding to the LCH among the plurality of SR configurations, wherein the SR is received from the terminal in case that an SR prohibit timer configured for the SR configuration is not running and a number of times of SR transmission counted for the SR configuration is lower than a maximum number of times of SR transmission configured for the SR configuration, wherein an SR prohibit timer is configured for each of the plurality of SR configurations, wherein a maximum number of times of SR transmission is configured for each of the plurality of SR configurations, wherein a number of times of SR transmission is counted for each of the plurality of SR configurations, wherein the SR configuration includes information on the SR prohibit timer for the SR configuration and information on the maximum number of times of SR transmission for the SR configuration, and wherein the SR is received on a physical uplink control channel (PUCCH) associated with the SR configuration.

15. The base station of claim 14, wherein, in case that the SR configuration is a first SR configuration, reception of the SR is based on an SR prohibit timer configured for the first SR configuration, a number of times of SR transmission counted for the first SR configuration, and a maximum number of times of SR transmission configured for the first SR configuration, and wherein, in case that the SR configuration is a second SR configuration, reception of the SR is based on an SR prohibit timer configured for the second SR configuration, a number of times of SR transmission counted for the second SR configuration, and a maximum number of times of SR transmission configured for the second SR configuration.

16. The base station of claim 14, wherein the uplink data occurred in the LCH is mapped to a numerology among the one or more numerologies.

* * * * *